United States Patent [19]

Wagner

[11] 4,247,654
[45] Jan. 27, 1981

[54] ALKOXYLATED FORMOSE POLYOLS AND THEIR USE IN POLYURETHANE PLASTICS

[75] Inventor: Kuno Wagner, Leverkusen, Fed. Rep. of Germany

[73] Assignee: Bayer Aktiengesellschaft, Leverkusen, Fed. Rep. of Germany

[21] Appl. No.: 15,082

[22] Filed: Feb. 26, 1979

Related U.S. Application Data

[63] Continuation of Ser. No. 829,170, Aug. 30, 1977, abandoned.

[30] Foreign Application Priority Data

Aug. 31, 1976 [DE] Fed. Rep. of Germany ....... 2639083

[51] Int. Cl.$^3$ .................... C08G 18/14; C08G 18/32; C08G 18/48
[52] U.S. Cl. ................................. 521/158; 521/175; 528/77; 528/79; 568/678; 568/679; 568/680
[58] Field of Search ................. 521/158, 175; 528/77, 528/79, ; 568/678, 679, 680

[56] References Cited

U.S. PATENT DOCUMENTS

| 2,224,910 | 12/1940 | Hanford et al. | 568/863 |
| 2,775,621 | 12/1956 | MacLean et al. | 568/863 |
| 2,927,918 | 3/1960 | Anderson | 568/679 |
| 3,833,669 | 9/1974 | Gehm et al. | 260/615 B |
| 3,865,806 | 2/1975 | Knodel | 260/611 |

FOREIGN PATENT DOCUMENTS

| 740245 | 10/1943 | Fed. Rep. of Germany | 568/863 |
| 851493 | 10/1952 | Fed. Rep. of Germany | 568/863 |
| 311788 | 5/1929 | United Kingdom | 568/863 |
| 745557 | 2/1956 | United Kingdom | 568/863 |

OTHER PUBLICATIONS

Gaylord, Polyethers, Part I, Interscience, N.Y. (1963), pp. 105–106, 197–200.
Schonfeldt, Surface-Active Ethylene Oxide Adducts, Pergamon Press, Oxford (1969), pp. 297, 534, 535 & 565.

Primary Examiner—H. S. Cockeram
Attorney, Agent, or Firm—Gene Harsh; Joseph C. Gil

[57] ABSTRACT

The invention is directed to a process for the production of polyether polyols having an average molecular weight of from 200 to 10,000 and an average hydroxyl functionality of from 2.0 to 7.0, comprising reacting one or more alkylene oxides, optionally successively, with a mixture of polyhydric alcohols which has been produced by reduction of the condensation products from the condensation of formaldehyde hydrate. The invention is also directed to the process for the production of polyether polyols characterized in that the mixture of polyhydric alcohols is mixed with dihydric and/or trihydric alcohols and/or monoamines or polyamines prior to alkoxylation. Finally, the invention is directed to the use of the alkoxylated mixtures as the isocyanate-reactive component in the production of optionally cellular polyurethane plastics.

10 Claims, 1 Drawing Figure

4,247,654

ALKOXYLATED FORMOSE POLYOLS AND THEIR USE IN POLYURETHANE PLASTICS

This is a continuation of application Ser. No. 829,170 filed Aug. 30, 1977.

POLYETHER POLYOLYS

This invention relates to novel polyalkylene glycol ethers which are based on a mixture of polyhydric alcohols obtained by the self-condensation of formaldehyde hydrate and which are valuable starting materials for the production of polyurethane foams.

BACKGROUND OF THE INVENTION

Processes for producing polyalkylene glycol ethers are known. In conventional processes, polyethers are obtained by the polymerization of epoxides on their own or by the addition of these epoxides to starter components containing reactive hydrogen atoms. Preferred starter components in conventional processes are, for example, sucrose (DAS Nos. 1,064,938 and 1,176,358 and DOS No. 1,443,022), sorbitol (British Pat. No. 876,496; Belgian Pat. No. 582,076 and Modern Plastics, May 1959, pages 151—154) and various difunctional and trifunctional polyhydricalcohols, such as ethylene glycol, propylene glycol, trimethylol propane and glycerol.

Polyether polyols having a hydroxyl functionality of 8 or 6 are obtained by reacting sucrose or sorbitol (or other hexavalent sugar alcohols). In cases where they have relatively low molecular weights, these highly functional polyethers are particularly suitable for the production of rigid and semi-rigid polyurethane foams which are distinguished by good dimensional stability.

For reacting sucrose and sorbitol with alkylene oxides on a commercial scale, the reaction mixture must be able to be satisfactorily stirred. The considerable heating effect developed during the reaction of alkylene oxides with hydroxyl compounds may only be adequately dissipated providing the reaction mixture may be thoroughly stirred.

However, under the conditions applied in the production of polyethers on an industrial scale, i.e., temperatures of from 95° to 115° C. and pressures of from 0.5 to 3.5 atmospheres, mixtures of alkylene oxides with sucrose or sorbitol cannot be properly stirred. The problem of stirring especially occurs in the case of sucrose. At the beginning of the alkylene oxide addition, large quantities of unreacted solid reactant are still present. Inadequately stirrable mixtures of sucrose and alkali metal hydroxide, which is generally used as catalyst in the production of polyethers, may give rise to caramelization and to carbonization reactions on the walls of the reaction vessel which are inevitably hot on account of the heating of the reaction mixture. Mixtures of sorbitol and alkylene oxides are also difficult to stir in cases where large quantities of unreacted sorbitol are present. The sorbitol is still present in solid form or just begins to melt at the reaction temperatures (m.p. 97.7° C.). The melts obtained are of relatively high viscosity.

Overheating in sorbitol melts, which may readily occur in inadequately stirred reaction mixtures, may give rise to the formation of so-called "sorbitol anhydrides" or "sorbitans" in the presence of alkali metal hydroxides. This in turn gives rise to a loss of functionality in the resulting polyethers and, hence, to a deterioration in the properties of the rigid polyurethane foams produced from them.

In order to obviate these disadvantages, it has been proposed to use mixtures of sucrose or sorbitol with low viscosity bifunctional or trifunctional polyhydric alcohols as starter components (DAS No. 1,285,741; DOS Nos. 1,443,372; 2,241,242; 2,521,739 and 2,549,449) or to employ aqueous solutions of more highly functional starters. However, in cases where sucrose or sorbitol is reacted with alkylene oxides in aqueous solution or in admixture with glycols, undesirable secondary reactions readily occur, such as partial hydrolysis of the alkylene oxides by the water used as reaction medium. The hydroylzed alkylene oxides, the polyalkylene glycols formed from them by reaction with more alkylene oxide and the other secondary products formed, whose presence is reflected in pronounced darkening in the color of the reaction mixture, adversely affect the properties of the rigid and semi-rigid polyurethane foams produced from these sucrose or sorbitol hydroxy alkyl ethers. One disadvantage of the rigid polyurethane foams obtained from sucrose polyethers produced in this way is their often limited number of closed cells and their resulting poor heat insulation capacity. Another effect of the high proportion of bifunctional and trifunctional secondary products in polyethers of this type is that the rigid polyurethane foams produced from these polyether mixtures show reduced dimensional stability.

Polyether polyols which have been obtained by reacting sucrose or sucrose/glycol mixtures and which have average molecular weights of from 500 to 1500 are liquids of relatively high viscosity. On account of the high viscosity, the reaction mixture undergoes a decrease in fluidity during the foaming process. The molds used for in-mold foaming are then inadequately filled. In addition, an irregular distribution of gross density is developed within the polyurethane foam, adversely affecting its compressive strength.

Polyethers which are suitable for the production of flexible polyurethane foams are generally obtained by known methods, i.e., by reacting trifunctional polyols, such as glycerol or trimethylol propane, with propylene oxide or ethylene oxide or with a mixture of propylene oxide and ethylene oxide. In many cases, the starter component is also reacted first with propylene oxide and then with ethylene oxide, so that polyethers predominantly containing primary terminal hydroxyl groups are formed.

Unfortunately, polyurethane foams produced from polyether polyols of this type are frequently unsatisfactory in regard to their compression hardness. Accordingly, to obtain flexible polyurethane foams having increased compression hardness, it has been proposed to mix bifunctional and trifunctional starters with sorbitol or sucrose and to react such mixtures with a large excess of ethylene oxide. This foams polyether polyols having an average molecular weight of from 1,000 to 10,000 (DOS Nos. 2,521,739 and 2,549,449). The reaction of sorbitol alone with alkylene oxides to form relatively high molecular weight polyether polyols having a hydroxyl number of from 20 to 60 is also known.

However, the industrial production of such polyether polyols by conventional processes also involves difficulties because the mixtures of the starter components either have a pasty consistency or are liquids of relatively high viscosity at room or at slightly elevated temperatures. Accordingly, starter components of this type cannot readily be pumped through pipes and, for this reason, require elaborate apparatus.

As in the case of rigid foam polyethers, these mixtures also cannot be satisfactorily stirred. For this reason, the reaction velocity of the alkylene oxides is reduced, giving rise to poor volume-time yields in the production of the polyether polyols. In addition, secondary products which are formed by decomposition of the inadequately stirred reaction mixtures on the hot walls of the reaction vessel lead to reductions in the quality of the resulting polyether polyols in regard to their hydroxyl functionality. In many cases, yellow to brown colored polyethers are obtained.

Accordingly, an object of the present invention is to synthesize polyalkylene glycol ethers which do not have any of the disadvantages referred to above. A further object of the present invention is to provide a process for the production of polyalkylene glycol ethers whose functionality may be adjusted to suit the particular application envisaged and may readily be obtained with virtually none of the disadvantages of conventional processes.

DESCRIPTION OF THE INVENTION

Figure 1:
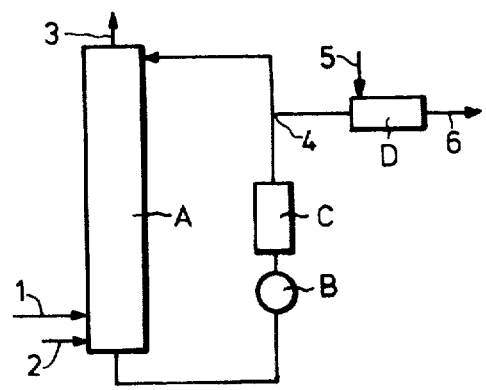
FIG. 1 shows in simplified form an apparatus suitable for carrying out the condensation of formaldehyde from synthesis gases continuously.
Figure 2:
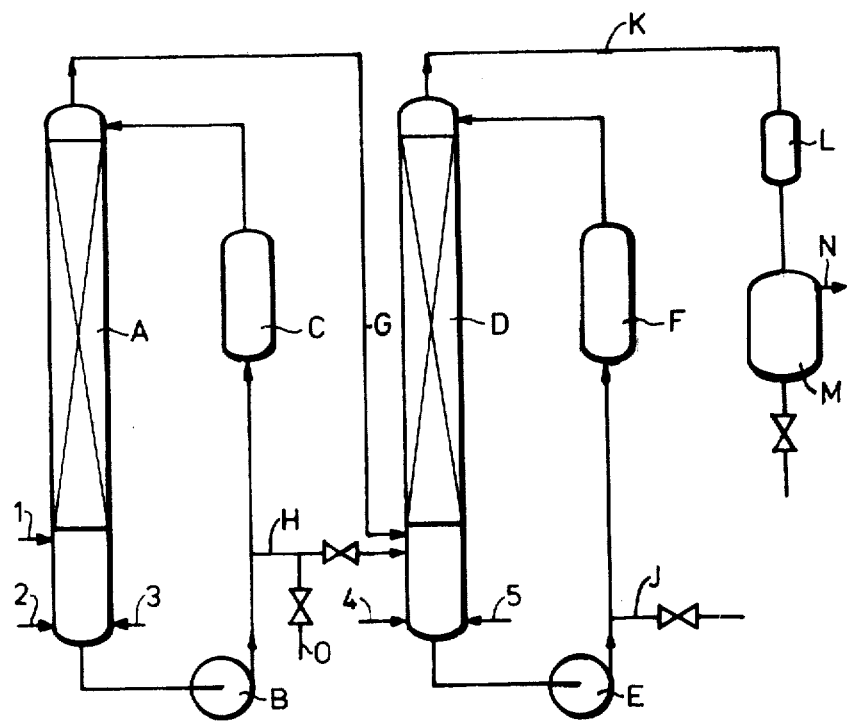

According to the present invention, these objects are achieved by subjecting certain mixtures of polyhydric alcohols to an alkoxylation reaction in the presence of catalysts. These mixtures are those which have been synthesized by the condensation of formaldehyde hydrate with itself to form hydroxyaldehydes and hydroxyketones, followed or accompanied by reduction of the carbonyl groups (which already takes place simultaneously with the condensation reaction), optionally in admixture with a low molecular weight polyol and/or mono-amine and/or polyamine.

Accordingly, the present invention relates to a process for the production of polyether polyols having an average molecular weight of from 200 to 10,000 and an average hydroxyl functionality of from 2.0 to 7.0, preferably from 2.5 to 6.0 and, with particular preference, from 2.8 to 5.5, wherein one or more alkylene oxides are reacted, optionally in succession, with a mixture of polyhydric alcohols which has been obtained by the condensation of formaldehyde with itself, followed by reduction of the condensation products, and which has optionally been mixed with additional bifunctional or trifunctional low molecular weight alcohols and/or monoamines or polyamines.

The production of mixtures of polyhydric alcohols by the condensation of formaldehyde hydrate with itself, followed by reduction of the condensation products, is known.

In this connection, reference is made, for example, to Pfeil, Chemische Berichte 84, 229 (1951), Pfeil et al, Chemische Berichte 85, 303 (1952), German Pat. Nos. 822,385; 830,951 and 884,794 and to U.S. Pat. No. 2,224,910. Since these known processes are attended by a number of disadvantages (toxicologically harmful catalysts, poor volume-time yields, colored secondary products which interfere with subsequent hydrogenation), it is preferred, in accordance with the present invention, to use as starters condensation products which have been produced by certain new processes.

These new processes give colorless formaldehyde condensation products which are free from decomposition products and which may readily be hydrogenated using small quantities of hydrogenation catalysts to form polyhydric alcohols. The mixtures of polyhydroxyl compounds obtained do not require further purification.

Another advantage of the new processes is that condensation of the formaldehyde may be controlled in such a way that the product distribution of the resulting mixtures of low molecular weight polyhydroxyl compounds may be varied according to the application envisaged and be reproducibly adjusted.

In one of the new processes, condensation of the formaldehyde hydrate is carried out in the presence of soluble or insoluble lead(II) salts, optionally bound to high molecular weight supports, as catalyst and in the presence, as co-catalyst, of a mixture of hydroxyaldehydes and hydroxyketones of the type formed in the condensation of formaldehyde hydrate and characterized by the following molar ratios:

$C_3$-compounds/$C_4$-compounds = from 0.5:1 to 2.0:1

$C_4$-compounds/$C_5$-compounds = from 0.2:1 to 2.0:1

$C_5$-compounds/$C_6$-compounds = from 0.5:1 to 5.0:1 the proportion of components containing from 3 to 6 carbon atoms amounting to at least 75%, by weight, preferably to more than 85%, by weight, based on the total co-catalyst.

The reaction temperature is generally from 70° to 110° C., preferably from 80° to 100° C. The pH-value of the reaction solution is adjusted first to from 6.0 to 8.0, preferably from 6.5 to 7.0 until conversion reaches from 10 to 60%, preferably from 30 to 50% by the controlled addition of an inorganic or organic base. Thereafter, it is adjusted in the second phase of the reaction to a value of from 4.0 to 6.0, preferably 5.0 to 6.0, so that the pH-value is lower by 0.5 to 3.0 units, preferably 0.8 to 1.7 than in the first phase. It has surprisingly been found that the product distribution of the corresponding polyol, hydroxyaldehyde and hydroxyketone mixtures may be reproducibly varied having different residual formaldehyde contents (from 0 to 10%, by weight, preferably from 0.5 to 0.6%, by weight) by this particular pH-control and by subsequent cooling.

After condensation of the formaldehyde hydrate with itself has been stopped at a residual formaldehyde content of from 0 to 10%, preferably from 0.5 to 6.0%, by weight, of formaldehyde, by cooling and/or by deactivating the lead-containing catalyst with acids, the catalyst is removed in known manner and the aldehyde and keto groups present in the reaction product are reduced into hydroxyl groups.

Although it is known that hydroxyaldehydes and hydroxyketones may be reduced using formaldehyde (for example, pentaerythritol may be synthesized from acetaldehyde and formaldehyde, for which purpose the acetaldehyde is initially methylolated to form pentaerythrose and then reduced by excess formaldehyde), such crossed Cannizzaro reactions may only be carried out in strongly alkaline medium. Accordingly, it was extremely surprising to find that these reactions take place with yields of from 30 to 75%, even in the acid pH-range, in the new process. A larger number of the carbonyl groups is advantageously reduced in this way, thereby considerably simplifying subsequent removal of the residual carbonyl groups by hydrogenation or reduction.

It was also surprising to find that highly concentrated aqueous solutions of polyols, hydroxyaldehydes and hydroxyketones may be obtained in this way in yields of from 95 to 98% and with high reproducibility of the average OH-functionality. These highly concentrated aqueous solutions are completely colorless and, accordingly, do not have to be further purified and decolorized. On the other hand, as mentioned above, heavily discolored troublesome secondary products are frequently formed in conventional processes as a result of decomposition reactions. Catalytic hydrogenation of the colorless reaction mixtures produced by the process described above, following removal of the lead-containing catalysts by simple precipitation reactions, is carried out under mild conditions such as are generally applied in the catalytic hydrogenation of sugars.

In the condensation of formaldehyde reaction, glycol aldehyde is initially formed in a first step from two molecules of formaldehyde. By the addition of more formaldehyde, glycerol aldehyde is formed in accordance with the following scheme:

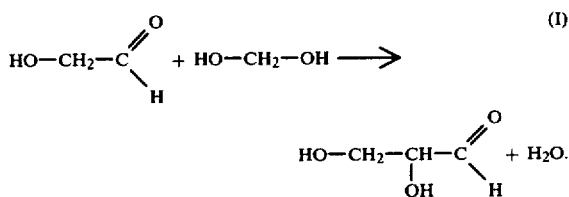

Mixtures of relatively high molecular weight hydroxyaldehydes and ketones are formed therefrom in a number of secondary reactions of which only a few are exemplified:

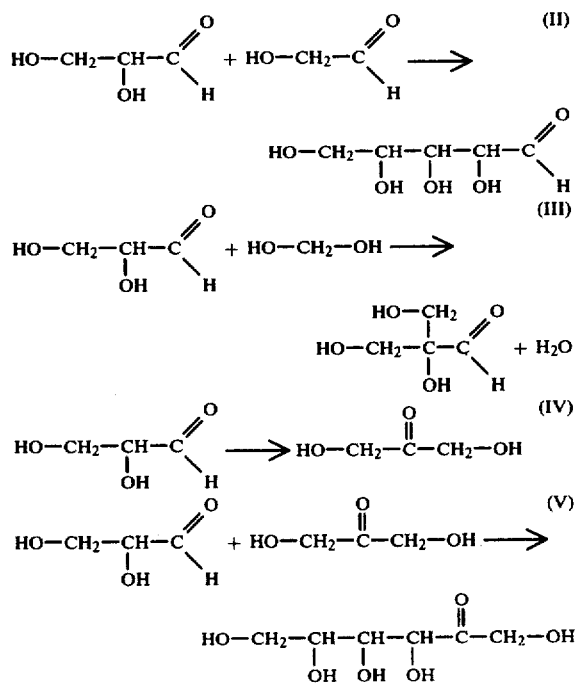

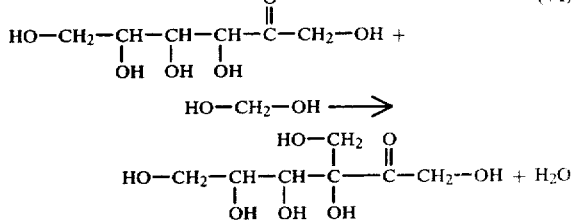

In the described process, condensation of the formaldehyde is preferably carried out using aqueous formaldehyde solutions of standard commercial-grade concentration (from 30 to 50%, by weight, of formaldehyde) which have been stabilized with methanol or other known stabilizers. However, it is also possible to use non-stabilized formaldehyde solutions containing proportions of solid, polymerized formaldehyde and/or to use paraformaldehyde dispersions. In the course of the process, these solids are dissolved by depolymerization and are also condensed into hydroxyaldehydes and hydroxyketones. The condensation reaction may also be carried out using formaldehyde solutions of even higher concentration, for example, of the type obtained by depolymerizing paraformaldehyde or by concentrating formaldehyde solutions of low concentration in vacuo. For example, hydroxyaldehydes and hydroxyketones may be obtained in very good yields by condensing a 65% formaldehyde solution obtained by concentrating a 37% formaldehyde solution in vacuo. The process may, of course, also be applied to less concentrated formaldehyde solutions, although it is less preferred for economic reasons to use formaldehyde solutions of low concentration on account of the additional energy costs required for evaporating the solvent.

The formation of hydroxyaldehydes and hydroxyketones takes place extremely quickly. For example, as much as about 80% of the formaldehyde initially introduced has generally been converted after a reaction time of only 30 minutes and, after 40 minutes, the formaldehyde content of the solution amounts to only from about 1 to 1.5%, corresponding to a conversion of from 96 to 97%. Accordingly, the volume-time yields of the new process are superior to those of all known processes for producing hydroxyaldehydes and hydroxyketones by the condensation of formaldehyde. Compared with the process described, for example, in German Pat. No. 884,794, the volume-time yield is improved by a factor of from 12 to 14.

As mentioned above, condensation of the formaldehyde to form hydroxyaldehydes and hydroxyketones is preferably promoted by water-soluble compounds of lead. These preferred catalysts (apart from the lead containing ion exchangers discussed below) include lead(II) acetate, lead(II) formate and lead(II) nitrate. The catalyst is generally used in a quantity of from about 0.01 to 10%, by weight, preferably from 0.1 to 5%, by weight, based on the formaldehyde used.

In general, the lead(II) ions are removed by precipitation with carbonate ions before working-up or hydrogenation of the reaction products. In this connection, it is of particular advantage and, in the interests of pollution control, particularly desirable to be able to re-use these precipitated lead salts as catalysts either directly or by way of the acetate. Accordingly, the ecologically harmful waste products formed in conventional processes are avoided by the new process. For this reason, the process is both ecologically and also economically superior to conventional processes in regard to the recycling of the lead-containing catalyst.

The lead(II) ions used as catalyst may also be removed by electrolytic deposition in the form of elemental lead. In this case, too, it is possible to re-use the lead as catalyst for the production process, for example, by conversion into the acetate.

The lead(II) ions may also be removed from the reaction solution in simple manner by pumping the reaction solution over cation-active ion exchangers. As shown by atomic absorption analysis, no more lead may be detected in the thus-treated reaction solution.

The ion exchangers, which after a while become completely or partly laden with lead during purification of, i.e., removal of lead from, the reaction solutions, or ion exchangers to which lead ions have been specifically applied by contact with a lead salt solution may also be used as catalysts for the condensation of formaldehyde. It has been found that these ion exchange resins laden with lead, for example, known sulphonated polystyrene resins crosslinked with divinyl benzene, crosslinked acrylic acid resins or modified formaldehyde-urea derivatives, catalyze condensation of the formaldehyde as effectively as the soluble lead salts themselves. One particular advantage in this respect is that the quantities of lead used may be considerably reduced by comparison with conventional processes. Another advantage is that these ion exchangers laden with lead may be directly recovered during desalting of the reaction solution and, after their use as catalyst, may also be re-used for desalting.

In this respect, it is of particular advantage to adopt the following procedure:

Depending upon the amount of the mixture, a certain quantity of ion exchange resin laden with lead is added to the reaction solution as solid catalyst. During the reaction, lead ions are given off to the reaction solution, as a result of which the solid catalyst is gradually depleted of lead ions. On completion of the reaction, the reaction solution is filtered off under suction from the ion exchanger and freed from lead by passage over ion exchangers which are not laden or only partly laden with lead. After repeated use, that part of the ion exchange resin which was used as solid catalyst is so heavily depleted of lead ions that its catalytic activity only diminishes to a small extent.

By contrast, the other part of the ion exchange resin which was used for removing the lead present in the solution is now very heavily laden with lead ions. After both parts have been rinsed with water, that part which was used for removing the lead from the reaction solution is used as catalyst while the other part, which meanwhile is no longer completely laden with lead, is used for absorbing the lead ions present in the reaction mixture.

In this way, the lead required for catalysis may be completely utilized without fresh quantities of lead salts being continuously used and forming harmful waste products. Accordingly, this procedure is of particular interest both for economic and also for ecological reasons.

One particular feature of the new process is also the use of a particular co-catalyst.

It is known from the literature that compounds containing enediol groups or compounds capable of forming enediol groups in accordance with the equation:

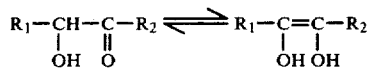

wherein $R_1$ and $R_2$ represent hydrogen atoms, alkyl, hydroxyalkyl or aryl groups; may be used as co-catalysts in the condensation of formaldehyde. According to U.S. Pat. No. 2,224,910, glucose, ascorbic acid, fructose, benzoin, glycol aldehyde, erythrose, reductones and invert sugar, are particularly used for this purpose. The co-catalysts are intended to prevent the induction period which occurs at the beginning of the condensation of formaldehyde. However, most of these co-catalysts only develop their catalytic activity at pH-values of $\leq 7$. In this pH-range, however, disproportionation of the formaldehyde occurs to an increased extent, leading to the formation of undesirable secondary products and to reduction in yield. Other co-catalysts may only be produced by elaborate synthesis processes and, for this reason, are expensive.

It has now surprisingly been found that the condensation of formaldehyde may be carried out without inhibition at the beginning of the reaction, even at pH-values below 7, providing the co-catalyst used is a particular mixture of hydroxyaldehydes and hydroxyketones (which may also contain catalytically inactive polyhydric alcohols) of the type obtained in the condensation of formaldehyde hydrate and characterized by the following molar ratios:

$C_3$-compounds/$C_4$-compounds = from 0.5:1 to 2.0:1

$C_4$-compounds/$C_5$-compounds = from 0.2:1 to 2.0:1

$C_5$-compounds/$C_6$-compounds = from 0.5:1 to 5.0:1

The co-catalyst mixture contains at least 75%, by weight, preferably more than 85%, by weight, of $C_3$–$C_6$ components.

The product mixture which is obtained in the new process itself and which generally lies within the specified molar ratios of $C_3$–$C_6$ components, providing the preferred reaction conditions defined above are maintained, is preferably used as co-catalyst. However, it is, of course, also possible to use mixtures of hydroxyaldehydes and ketones obtained by conventional processes, provided that the required mixing ratios of the components are maintained (the necessary quantitative ratio of the $C_3$–$C_6$ components may optionally be adjusted, for example, by adding glycerol aldehyde, erythrose or fructose and glucose). As mentioned above, however, the condensation products according to the prior art frequently contain browning products and have to be purified before they may be used as co-catalyst.

In general, the co-catalyst is used in quantities of from about 0.1 to 50%, by weight, preferably from 0.5 to 5%, by weight, and, with particular preference, from 1 to 3%, by weight, based on the formaldehyde used.

In the presence of the above-defined co-catalyst, the condensation reaction takes place so quickly that it leads to the above-mentioned advantages in regard to the improved volume-time yield. Since condensation of the formaldehyde to form hydroxyaldehydes and hydroxyketones under the conditions defined above takes place so quickly at temperatures above 95° C. that the reaction mixture is spontaneously heated by the heat liberated, the reaction solution need only be heated to from 90° to 100° C. The external heat source may then be removed. The quantities of heat liberated during the exothermic reaction are then sufficiently large that the reaction solution is kept boiling gently throughout the entire duration of the reaction. However, the velocity of the reaction in the above-mentioned pH-range is slow enough to enable the reaction to be interrupted at any time by external cooling or by the addition of acids in cases where a corresponding residual formaldehyde content or the associated product distribution is required. The described pH-control is of particular advantage because, in this range, the reaction velocity may be controlled very easily merely by altering the pH to a slight extent. Any relatively large amounts of heat given off in spite of this, which would lead to more vigorous boiling, may be dissipated very easily by external cooling.

Inorganic bases suitable for condensation of the formaldehyde are, for example, NaOH, KOH, CaO, Ca(OH)$_2$, MgO and Mg(OH)$_2$. Suitable organic bases are, for example, urotropin, pyridine, secondary and tertiary amines and also "crown ether" complexes of alkali metals.

The formaldehyde condensation reaction may be carried out with particular advantage in a continuous series of stirrer-equipped vessels. In this embodiment of the process, the residual formaldehyde content may be exactly adjusted by varying the residence time in the individual vessels. The product distribution of the reaction mixture and the average hydroxyl functionality of the mixture of polyhydric alcohols obtainable therefrom by reduction may readily be varied within wide limits and be reproduced in this way.

It is equally possible to produce a mixture of compounds containing hydroxyl groups in a continuously operated reaction tube. In order to maintain a required pH-value throughout the entire reaction volume, inorganic or organic base is continuously added in the requisite quantity at several points along the tube. In this case, too, it is possible by varying the throughflow times to vary the product distribution and hydroxyl functionality of the resulting polyhydric alcohols within wide limits. It is, of course, also possible in this embodiment of the process to obtain mixtures, which predominantly contain relatively high molecular weight compounds, free from colored secondary products.

In the new process, relatively high molecular weight polyols, hydroxyaldehydes and hydroxketones (in particular having 5 or 6 carbon atoms) are obtained in the absence of any troublesome, colored secondary products by continuing the reaction up to a residual formaldehyde content of from 0 to 1.5% by weight, and then stopping it by cooling and/or deactivating the catalyst. The thus-obtained product mixtures are substantially free from formaldehyde.

By carrying out the reaction in the manner described above, in conjunction with the co-catalysts defined above, it is surprisingly possible in this case, too, to control the reaction in such a way that the undesirable "Cannizzaro" reaction of the formaldehyde on its own (disproportionation in methanol and formic acid), which reduces the formation of hydroxyaldehydes and ketones, is largely avoided and no browning reactions occur.

As shown by gas-chromatographic analysis of the hydrogenated and silylated reaction products, approximately 45%, by weight, of hexahydric alcohols, 25%, by weight, of pentahydric alcohols and approximately 20%, by weight, of heptahydric and higher hydric alcohols are formed in the above-mentioned preferred embodiment of the process in which the reaction is continued to a residual formaldehyde content of from 0 to 1.5%, by weight. By contrast, a total of only about 10% of dihydric, trihydric and tetrahydric alcohols is obtained. This corresponds to an average functionality of about 5.6.

Mixtures having predominant contents of relatively high molecular weight products are also obtained by subsequently after-treating hydroxyaldehyde and hydroxyketone mixtures, which predominantly contain low molecular weight products, with excess formaldehyde for from about 10 minutes to 12 hours at from 10° to 100° C., preferably from 30° to 60° C., in the presence of an inorganic or organic base at pH-values of from 9 to 13, preferably from 10 to 11. In this way, not only are the low molecular weight compounds converted into relatively high molecular weight compounds by an alkaline catalyzed aldol reaction, but branched hydroxyaldehydes and hydroxyketones are also formed to an increased extent by additional methylolation on the carbon atom adjacent the carbonyl group. These branched hydroxyketones and hydroxyaldehydes contain considerably more primary hydroxyl groups than the straight-chain hydroxyketones and hydroxyaldehydes. The reactivity of these mixtures to reagents which are reactive with hydroxyl groups is thus considerably increased, which is of advantage for some applications. For example, when the thus-produced compounds are reacted with organic isocyanates, urethanes are formed considerably faster, by virtue of the presence of primary OH-groups, than is the case with normal straight-chain polyhydric alcohols containing secondary OH-groups.

Polyhydric alcohols may readily be obtained from the hydroxyaldehydes and hydroxyketones formed during condensation of the formaldehyde by reduction using known methods. For example, reduction may be carried out directly in the aqueous solution obtained using sodium borohydride at temperatures as low as room temperature. It may also be carried out electrolytically. Catalytic hydrogenation using hydrogen is also possible. In principle, any conventional processes for reducing sugars to sugar alcohols may be used for this purpose. Hydrogenation with Raney nickel in quantities of from 5 to 20%, by weight, based on the mixture of hydroxyaldehydes and hydroxyketones to be produced, is particularly favorable, being carried out under hydrogen pressures of from 50 to 200 kg/cm$^2$ and at temperatures of from 20° to 200° C. However, catalysts containing nickel, cobalt, copper, platinum, rhodium or palladium on inert supports may be used with equal effect.

By carrying out the reaction under the conditions described above, hardly any decomposition products are formed to interfere with the hydrogenation process. In particular, substantially no carboxyl-containing compounds, such as lactic acid and sugar acids, are formed to reduce the activity of acid-labile hydrogenation catalysts. Accordingly, it is possible to use the hydrogenation catalysts repeatedly without any loss of activity for the hydrogenation of the mixtures of hydroxyaldehydes, hydroxyketones and polyhydric alcohols formed in accordance with the present invention.

As described above, condensation of the formaldehyde may be carried out by suitable pH-control in such a way that a large proportion of the hydroxyaldehydes and hydroxyketones formed is reduced in situ to polyhydric alcohols by the formaldehyde present in the reaction mixture. It is also possible subsequently to reduce the hydroxyaldehydes and ketones (formed to an increased extent in a procedure deviating somewhat from the preferred pH-control) using formaldehyde. To this end, excess formaldehyde and an inorganic base are added to the reaction solution, followed by stirring for from 30 minutes to 12 hours at from 10° to 100° C. preferably from 20° to 60° C., at a pH-value maintained in the range of from 9 to 13, preferably from 10 to 11. It is possible in this way not only to reduce the carbonyl function, but at the same time to synthesize relatively high molecular weight and branched products, as explained above. Preferred inorganic bases which accelerate the crossed Cannizzaro reaction are sodium hydroxide, potassium hydroxide, calcium and barium hydroxide and also "crown ether" complexes of alkali metals.

The reduction reaction may be further accelerated by co-catalysts. Co-catalysts preferably used for this purpose are oxalates of transition metals, especially nickel, cobalt, iron, cadmium, zinc, chromium and manganese oxalate, also transition metals in elemental form, for example, nickel, cobalt, iron, copper, cadmium, zinc, chromium and manganese. Activated nickel, used in the form of so-called "Raney nickel", and elemental zinc in powder form are particularly preferred.

Other suitable co-catalysts for reduction using formaldehyde are amides of organic acids, such as formamide, dimethyl formamide and acetamide, also tetraalkyl ammonium salts, especially tetramethyl ammonium chloride and tetraethyl ammonium chloride.

Another of the new processes for producing formaldehyde condensation products entails the use of a cocatalyst which comprises partially oxidized di- or higher hydric alcohols. The process involves the preparation of mixtures of low molecular weight, polyhydric alcohols and hydroxyaldehydes and hydroxyketones by the condensation of formaldehyde in the presence of from 0.01 to 10% by weight, based on the formaldehyde, of metal compounds as catalysts and from 0.1 to 10% by weight of co-catalysts based on compounds capable of enediol formation, which process is characterized in that aqueous formalin solutions and/or paraformaldehyde dispersions containing from 20 to 65% by weight of formaldehyde are condensed at a reaction temperature of from 70° to 120° C., preferably 90° to 105° C., in the presence of (I) a soluble or insoluble compound of a metal of the 2nd to 4th Main or 1st to 8th sub-Group of the Periodic System of Elements, optionally bound to a high molecular weight carrier, and (II) a co-catalyst prepared by partial oxidation of a dihydric or higher hydric alcohol containing at least two OH groups adjacent to each other and having a molecular weight of between 62 and 242 or a mixture of such alcohols.

The pH of the reaction solution is maintained at between 6.0 and 9.0, preferably between 7.5 and 8.5 by controlled addition of an inorganic and/or organic base up to a conversion rate of the starting materials of from 5 to 40%, preferably 10 to 20%, and thereafter at between 4.5 and 8.0, preferably between 5.5 and 7.5 until termination of the condensation reaction. In this second phase of the reaction the pH preferably is lower by 1.0 to 3.0 units than in the first phase of the reaction. The reaction is stopped when the residual formaldehyde content is from 0 to 10% by weight, preferably from 0.1 to 6% by weight, e.g. by the addition of acid to inactivate the catalyst. The catalyst is then removed, preferably by precipitation reactions or by cathodic electrochemical deposition, and the aldehyde and keto groups in the reaction product are optionally reduced to hydroxyl groups.

The condensation of formaldehyde hydrate without inhibition at the beginning of the reaction will proceed at pH values below 7 as well as above 7 substantially without a Cannizzaro reaction if, according to the new process, mixtures of products which have been prepared by partial oxidation of dihydric or higher hydric alcohols or alcohol mixtures having at least two hydroxyl groups on adjacent carbon atoms and which contain, inter alia, hydroxyaldehydes, hydroxyketones and hydroxy acids in addition to unoxidized (catalytically inactive) polyhydric alcohols are used as cocatalysts.

It is immaterial whether oxidation of the polyhydric alcohols takes place in a completely separate reaction step or immediately before the condensation reaction according to the invention or even later, in the reaction mixture itself. However, for practical reasons it is preferred to carry out this oxidation reaction during the passage of the reactants to the reaction vessel for formaldehyde condensation. Most preferably, it is carried out in situ in the aqueous formaldehyde solution. It is extremely surprising to find that sufficient quantities of cocatalysts are formed in this last mentioned variation of the process. Owing to the readiness with which formaldehyde oxidizes (it may be remembered here that formaldehyde is commonly determined by its reaction with $H_2O_2$: $2HCHO + H_2O_2 + 2NaOH = H_2 + 2HCOONa + 2H_2O$) it was to be assumed that the oxidizing agent would only react to a very minor extent, if at all, with the polyhydric alcohol to form hydroxyaldehydes, ketones, carboxylic acids, etc. and would attack mainly the concentrated formaldehyde.

The reaction mechanism of the process according to the invention and the mode of action of the cocatalysts are still to a large extent unknown. This applies particularly to the initial phase of the condensation reaction, in which the accelerating action of the catalyst/cocatalyst system according to the invention is particularly important. However, it may be assumed, without this assumption in any way restricting the scope of protection of the present invention, that the hydroxyaldehyde (or hydroxyketone) formed in a first stage of the process from a polyhydric alcohol is not solely responsible for the catalytic effect. This follows partly from the fact that aldehyde functional groups are much more readily oxidized than hydroxyl groups. Thus, in the case of partial oxidation of polyhydric alcohols, only very small quantities of hydroxyaldehydes are ever formed in addition to the main product, which consists of hydroxycarboxylic acids. Partly from the observation that when a hydroxyaldehyde (e.g. glycol aldehyde or glyceraldehyde), alone or as mixture with a corresponding polyalcohol, is used as cocatalyst for the condensation of formaldehyde, it gives rise to the formation of quite unsatisfactory, brownish products. It is more likely, although surprising, that the hydroxy carboxylic acids act as cocatalysts, either alone or as synergistic combinations with the traces of hydroxyaldehydes and/or ketones present or possibly also with the unoxidized polyol present.

The quantity of polyhydric alcohol or alcohol mixture to be used according to the invention may vary within wide limits. In many cases, for example, 1% by weight of alcohol, based on the quantity of formaldehyde put into the process, is capable of producing entirely sufficient quantities of cocatalyst. However, it is advantageous to use larger quantities, approximately 2 to 10% by weight, based on the formaldehyde, of polyhydric alcohol or alcohol mixture. This is particularly true if oxidation is carried out in situ, so that right from the beginning of formaldehyde condensation sufficient oxidation products of these alcohols will be formed and will be available as cocatalyst.

The quantity of polyhydric alcohol or alcohol mixture used should generally not fall below the lower limit of 0.001 OH equivalents, based on 1 mol of formaldehyde put into the process, because the cocatalytic activity is then too weak. In theory, no upper limit need be set although for practical reasons it is preferable not to use more than 0.10 OH equivalents. It is particularly advantageous to use the alcohol or alcohol mixture in quantities of from 0.002 to 0.02 OH equivalents, based on 1 mol of formaldehyde.

The upper limit on the quantity of oxidizing agent to be used is set by the quantity of polyhydric alcohol or alcohol mixture present since only the partially oxidized (to hydroxyaldehydes, ketones and carboxylic acids) alcohols act as cocatalyst (see above). By "partially oxidized" is meant, in the context of this invention, that not more than 85%, preferably less than 70% and most preferably less than 50% of all the hydroxyl groups in the polyhydric alcohol are oxidized. According to the invention, one may, of course, use slightly more than the maximum quantity of oxidizing agent theoretically calculated from these figures since part of the oxidizing agent is lost by its reaction with formaldehyde, particularly in the preferred variation of the process, in which the cocatalyst is formed in situ. However, there should not be used more oxidizing agent than the quantity theoretically calculated for the oxidation of all the hydroxyl groups of the polyhydric alcohol to keto or carboxyl groups. Otherwise too many side reactions take place, and the total yield of formaldehyde condensation products is reduced.

As in the case of the alcohol, the quantity of oxidizing agent should not fall below the lower limit of 0.001 equivalents of oxidizing agent per mol of formaldehyde because otherwise the proportion of oxidation products which are active as cocatalysts becomes too low.

The following are examples of alcohols which are suitable for preparation of the cocatalyst by partial oxidation, preferably along the mixing path: Propylene glycol-(1,2), butylene glycol-(2,3), hexanediol-(2,3) and -(3,4), 2-methyl-1,2-propanediol, butanetriol-(1,2,4), hexanetriol-(1,2,6), erythritol, quinitol, mannitol, sorbitol and methyl glycoside. It is preferred to use polyhydroxyl alcohols having at least one primary hydroxyl group but ethylene glycol, glycerol and the reduced sugar alcohol mixtures obtained by crossed Cannizzaro reactions in formaldehyde condensations are particularly preferred.

Any known oxidizing agents for alcohols may be used for the partial oxidation of the above-mentioned dihydric or higher hydric alcohols, or mixtures thereof, which have at least two adjacent hydroxyl groups. The following are examples of suitable oxidizing agents: Compounds of divalent copper, e.g. copper(II) nitrate; compounds of trivalent iron, e.g. iron(III) chloride and potassium hexacyanoferrate(III); compounds of monovalent silver, e.g. silver(I) oxide; compounds of tetravalent or heptavalent manganese, e.g. manganese dioxide or potassium permanganate; compounds of pentavalent vanadium, e.g. divanadium pentoxide; compounds of hexavalent chromium, e.g. chromium trioxide, chromic acid and sodium or potassium dichromate; selenium dioxide, osmium tetroxide, hydrogen peroxide; oxygen compounds of nitrogen, e.g. alkali metal hyponitrite, nitrous acid or its salts and nitric acid or its salts; halogens and their heptavalent oxygen compounds, e.g. sodium periodate or potassium perchlorate; inorganic or organic peracids or their salts, e.g. sodium pyrosulphate, ammonium peroxy disulphate, peracetic acid and perbenzoic acid; also oxygen or air. Readily available oxygen containing compounds such as nitric acid, hydrogen peroxide or chromic acid are preferably used.

Potassium permanganate and lead(IV) oxide (which acts both as oxidizing agent and as catalyst) are particularly preferred. Anodic oxidation is also possible.

As already mentioned above, it is theoretically possible to prepare the cocatalyst separately by partial oxidation of the polyhydroxyl compound and then to add it to the reaction mixture in the desired quantity. In many cases, however, the partially oxidized polyhydric alcohols are not stable in storage and tend to undergo reactions which cause brown discoloration. For this reason, and for reasons of simplicity, it is preferable to combine the polyhydric alcohol and oxidizing agent along the mixing path, i.e. immediately before the addition to the aqueous formaldehyde solution or to add the oxidizing agent to the previously prepared reaction mixture of formaldehyde solution, polyhydroxyl compound having at least two adjacent hydroxyl groups, and catalyst. Even when oxidation is carried out in a separate step or along the mixing path, the polyhydric alcohol is preferably oxidized in the presence of the metal catalyst. Presumably, when this method is employed the enediol compounds formed as intermediate products are absorbed by the metal ion by a process of complex formation and thus converted into a catalytically particularly active form.

A third new process for producing formaldehyde condensation products involves the use of at least 10% low and/or high molecular weight polyhydroxyl compounds, with or without the addition of co-catalysts capable of enediol formation. The process involves the preparation of mixtures of low molecular weight polyhydroxyl compounds and optionally hydroxyaldehydes and hydroxyketones by the condensation of formaldehyde in the presence of from 0.01 to 10% by weight, based on the quantity of formaldehyde, of metal compounds as catalysts and from 0 to 10% by weight, based on the quantity of formaldehyde, of co-catalysts based on compounds capable of enediol formation, which process is characterized in that aqueous formalin solutions and/or paraformaldehyde dispersions containing from 20 to 65% by weight of formaldehyde are condensed at a reaction temperature of from 70° to 120° C., preferably 90° to 110° C., in the presence of (I) a soluble or insoluble compound of a metal of the 1st to 8th sub-Group or of the 2nd to 4th Main Group of the Periodic System of Elements, which may be bound to a high molecular weight carrier, and (II) more than 10% by weight, based on the quantity of formaldehyde, of one or more monohydric or polyhydric low molecular weight alcohol(s) and/or higher molecular weight polyhydroxyl compounds, in which process the pH of the reaction solution is maintained at between 5.5 and 9.0, preferably between 6.5 and 8.5 by controlled addition of one or more inorganic and/or organic bases up to a conversion rate of the starting materials of from 5 to 40%, preferably 10 to 20%, and thereafter at between 4.0 and 8.5, preferably between 5.5 and 7.5 until termination of the condensation reaction so that preferably in this second phase of the reaction the pH is lower by 0.5 to 3.0 units than in the first phase of the reaction, and the reaction is stopped when the residual formaldehyde content is from 0 to 10% by weight, preferably from 0.1 to 6% by weight, by inactivation of the catalyst in known manner, e.g. by the addition of acid, and the catalyst is then removed, preferably either by precipitation reactions or by cathodic electrochemical deposition, and the aldehyde and keto groups in the reaction product are then optionally reduced to hydroxyl groups.

The use of relatively large quantities of monohydric or polyhydric low molecular weight alcohols and/or higher molecular weight polyhydroxyl compounds during the self-condensation of formaldehyde affords important advantages. Firstly, it considerably facilitates the complete removal of water from the product mixture by evaporation under vacuum. Furthermore, reaction temperatures above 100° C. may be employed, so that the volume/time yield is improved.

The viscosity of the product is also surprisingly found to be considerably lower than that of formaldehyde condensation products produced without the addition of the above mentioned compounds according to the invention. The processing characteristics of the products are thereby substantially improved. The products obtained according to the invention are compatible with many other starting components used for the production of polyurethane resins, particularly foam resins, e.g. polyethers, polyesters and blowing agents. This is particularly surprising in view of the fact that, when previously known polyols prepared by formaldehyde condensation reactions are mixed with blowing agents, flocculation and cloudiness are observed. The miscibility of the individual components can be even further improved in the process according to the invention by adding known emulsifiers, anticoagulants and stabilizers for emulsions, dispersions and suspensions.

The quantity of monohydric or polyhydric alcohol or higher molecular weight polyhydroxyl compound used as reaction medium according to the invention may vary within wide limits, depending on the purpose for which the end product is to be used. It is advantageous to use more than about 10% by weight thereof, or 0.1 hydroxyl equivalents, based on the quantity of formaldehyde. There is no upper limit which must be observed. The limit is chosen in any individual case depending on the quantity of additional polyhydroxyl compound desired for the particular polyurethane formulation. Quantities of between 20% by weight and 500 hydroxyl equivalents, based in each case on the quantity of formaldehyde are preferably used. If more than 500 hydroxyl equivalents of polyhydroxyl compounds are used, based on 1 mol of formaldehyde, it is generally no longer possible to follow the conversion of formaldehyde accurately.

Low molecular weight alcohols in this context means alcohols having a molecular weight of between 62 and 400 and having from 1 to 8, preferably 2 to 6, hydroxyl groups. The alcohols are preferably liquid at room temperature either on their own or when mixed with formalin solution. Alcohols which have at least two adjacent hydroxyl groups are also particularly preferred because they can easily be converted into cocatalytically active compounds by partial oxidation, as will be explained below.

The following are examples of low molecular weight alcohols in which condensation of formaldehyde can readily be carried out: 2-Ethoxyethanol; 2-propoxyethanol; 2-isopropoxyethanol; 2-butoxyethanol; 2-(2-methoxyethoxy)-ethanol; 2-(2-ethoxyethoxy)-ethanol; 1,2-bis-(2-hydroxyethoxy)-ethane; ethylene glycol; diethylene glycol; triethylene glycol; tetraethyleneglycol; 1,2-propanediol; dipropyleneglycol; tripropylene glycol; 1,3-propanediol; 1,2-butanediol; 1,3-butanediol; 2-methoxy-1-butanol; 2,3-butanediol; 1,5-pentanediol; 2,2-dimethyl-1,3-propanediol; 1,6-hexanediol; 2,5-hexanediol; 2-methyl-2,4-pentanediol; 3-methyl-1,5-pentanediol; 3-methyl-2,4-pentanediol; 2,3-dimethyl-2,3-butanediol; 2-methyl-2-propyl-1,3-propanediol; 2,2-diethyl-1,3-propanediol; 2-ethyl-1,3-hexanediol; 2,5-dimethyl-2,5-hexanediol; 2,2,4-trimethyl-1,3-pentanediol; 1,3-diethoxy-2-propanol; 2-hydroxymethyl-2-methyl-1,3-propanediol; 1,2,6-hexanetriol; 2-ethyl-2-hydroxymethyl-1,3-propanediol; 2,2-bis-hydroxymethyl-1,3-propanediol; erythritol; quinitol; mannitol; sorbitol and methyl glycoside, and ethoxylation and propoxylation products of these alcohols with molecular weights of up to 400 and, of course, also mixtures of these alcohols. Ethylene glycol, glycerol and 1,4-butanediol as well as sugar alcohol mixtures obtained by a cross Cannizzaro reaction during formaldehyde condensation are particularly preferred.

Higher molecular weight polyhydroxyl compounds in which condensation of formaldehyde may be carried out are those with molecular weights from 400 to 10,000, preferably 500 to 600. They may be used according to the invention for formaldehyde condensation, optionally as mixtures with the above mentioned alcohols. These polyhydroxyl compounds are also preferably liquid at room temperature or soluble in the aqueous formaldehyde solution. They include, for example, polyesters, polyethers, polythioethers, polyacetals, polycarbonates and polyester amides having at least 2, generally 2 to 8, preferably 2 to 4 hydroxyl groups, such as the hydroxyl compounds known per se for the production of both homogeneous and cellular polyurethanes.

Suitable polyesters with hydroxyl groups include, for example, reaction products of polyvalent, preferably divalent alcohols, to which trivalent alcohols may be added, and polyvalent, preferably divalent carboxylic acids. Instead of free polycarboxylic acids, the corresponding polycarboxylic acid anhydrides or corresponding polycarboxylic acid esters of lower alcohols or mixtures thereof may, of course, be used for preparing the polyesters. The polycarboxylic acids may be aliphatic, cycloaliphatic, aromatic and/or heterocyclic and they may be substituted, e.g. by halogen atoms, and/or unsaturated.

The following are mentioned as examples: Succinic acid, adipic acid, suberic acid, azelaic acid, sebacic acid, phthalic acid, isophthalic acid, trimellitic acid, phthalic acid anhydride, tetrahydrophthalic acid anhydride, hexahydrophthalic acid anhydride, tetrachlorophthalic acid anhydride, endomethylene tetrahydrophthalic acid anhydride, glutaric acid anhydride, maleic acid, maleic acid anhydride, fumaric acid, dimeric and trimeric fatty acids such as oleic acid which may be mixed with monomeric fatty acids, dimethyl terephthalate and terephthalic acid-bis-glycol esters. The following are examples of suitable polyvalent alcohols: Ethylene glycol, propylene glycol-(1,2) and -(1,3), butylene glycol-(1,4) and -(2,3), hexanediol-(1,6), octanediol-(1,8), neopentylglycol, cyclohexanedimethanol (1,4-bis-hydroxymethylcyclohexane), 2-methyl-1,3-propanediol, glycerol, trimethylolpropane, hexanetriol-(1,2,6), butanetriol-(1,2,4), trimethylolethane, pentaerythritol, quinitol, mannitol and sorbitol, methylglycoside, diethylene glycol, triethylene glycol, tetraethylene glycol, polyethylene glycols, dipropylene glycol, polypropylene glycols, dibutylene glycol and polybutylene glycols. The polyesters may also contain a proportion of carboxyl end groups. Polyesters of lactones such as ϵ-caprolactone or hydroxycarboxylic acids such as ω-hydroxycaproic acid may also be used.

The polyethers used according to the invention which have at least 2, generally 2 to 8 and preferably 2 to 3 hydroxyl groups are also known per se. They are prepared, for example, by polymerization of epoxides such as ethylene oxide, propylene oxide, butylene oxide, tetrahydrofuran, styrene oxide or epichlorohydrin, either each on its own, e.g. in the presence of boron trifluoride, or by addition of these epoxides, either as mixtures or successively, to starting components having reactive hydrogen atoms. These starting components include water, alcohols, ammonia or amines, e.g. ethylene glycol, propylene glycol-(1,3) or (1,2), trimethylolpropane, 4,4'-dihydroxy-diphenylpropane, aniline, ammonia, ethanolamine or ethylene diamine. Sucrose polyethers may also be used according to the invention, e.g. those described in German Auslegeschriften Nos. 1,176,358 and 1,064,938. It is in many cases preferred to use polyethers which contain predominantly primary hydroxyl groups; up to 90% by weight, based on all the hydroxyl groups present in the polyether. Polyethers modified with vinyl polymers, e.g. the compounds obtained by polymerization of styrene or acrylonitrile in the presence of polyethers (U.S. Pat. Nos. 3,383,351; 3,304,273; 3,523,093 and 3,110,695 and German Pat. No. 1,152,536) are also suitable, as well as polybutadienes which have hydroxyl groups.

Particularly suitable among the polythioethers are the condensation products obtained by reacting thiodiglycol on its own and/or with other glycols, dicarboxylic acids, formaldehyde, aminocarboxylic acids or amino alcohols. The products obtained are polythio mixed ethers, polythio ether esters or polythio ether ester amides, depending on the cocomponents.

Suitable polyacetals include, for example, the compounds which can be prepared from glycols such as diethylene glycol, triethylene glycol, 4,4'-dioxethoxydiphenyl dimethylmethane, hexanediol and formaldehyde. Suitable polyacetals for the purpose of the invention may also be prepared by the polymerization of cyclic acetals.

The polycarbonates with hydroxyl groups used may be of the kind known per se, for example those which can be prepared by the reaction of diols such as propanediol-(1,3), butanediol-(1,4) and/or hexanediol-(1,6), diethylene glycol, triethylene glycol or tetraethylene glycol with diarylcarbonates, e.g. with diphenylcarbonate or phosgene.

Suitable polyester amides and polyamides include, for example, the predominantly linear condensates prepared from polyvalent saturated and unsaturated carboxylic acids or their anhydrides and polyvalent saturated and unsaturated amino alcohols, diamines, polyamines and mixtures thereof.

Polyhydroxyl compounds already containing urethane or urea groups and modified or unmodified natural polyols such as castor oil, carbohydrates or starch may also be used. Addition products of alkylene oxides and phenol formaldehyde resins or of alkylene oxides and urea formaldehyde resins are also suitable for the purpose of the invention.

Representatives of these compounds which may be present during condensation of formaldehyde have been described, for example, in High Polymers, Vol. XVI, "Polyurethanes, Chemistry and Technology" by Saunders-Frisch, Interscience Publishers, New York, London, Volume I, 1962, pages 32–42 and pages 44–54 and Volume II, 1964, pages 5–6 and 198–199 and Kunststoff-Handbuch, Volume VII, Vieweg-Höchtlen, Carl-Hanser-Verlag, Munich, 1966, e.g. on pages 45 to 71.

Mixtures of the above mentioned compounds which contain at least two hydrogen atoms capable of reacting with isocyanates and have a molecular weight of from 400 to 10,000 may, of course, also be used, for example mixtures of polyethers and polyesters.

Polyhydroxyl compounds which contain high molecular weight polyadducts or polycondensates in a finely dispersed or dissolved form may also be present during condensation of formaldehyde. Such modified polyhydroxyl compounds are obtained when polyaddition reactions (e.g. reactions between polyisocyanates and aminofunctional compounds) or polycondensation reactions (e.g. between formaldehyde and phenols and/or amines) are carried out in situ in the above mentioned hydroxyl compounds. Processes of this kind have been described, for example, in German Auslegeschriften Nos. 1,168,075 and 1,260,142 and German Offenlegungsschriften Nos. 2,324,134; 2,423,984; 2,512,385; 2,513,815; 2,550,796; 2,550,797; 2,550,833 and 2,550,862. According to U.S. Pat. No. 3,869,413 or German Offenlegungsschrift No. 2,550,860, modified polyhydroxyl compounds of this kind can also be obtained by mixing a previously prepared aqueous polymer dispersion with a polyhydroxyl compound and then removing the water from the mixture.

Another variation on the above mentioned new processes for producing formaldehyde condensation products is in using substantially impure formaldehyde synthesis gases of the type formed in the commercial production of formaldehyde as the formaldehyde source instead of aqueous formalin solutions. Reference is made in this respect to my co-pending application with the U.S. Ser. No. 829,173 now abandoned.

Any synthesis gases of the type obtained in the commercial production of formaldehyde may be used for producing formaldehyde condensation products. Examples of commercial processes for the manufacture of formaldehyde include the dehydrogenation of methanol and the oxidation of methanol on suitable catalysts, for example silver or iron molybdenum oxide, in the presence of air, optionally steam and formaldehyde exhaust gases. Another method is the oxidation of methane or ethylene or higher olefins or dimethyl ethers with air or oxygen-containing gases on suitable catalysts. These industrial synthesis gases generally contain as their main constituents from 20 to 70% by volume of nitrogen, 1 to 20% by volume of formaldehyde, 1 to 10% by volume of carbon dioxide and, in general, depending upon the manufacturing process, also relatively large quantities of steam. The remaining compounds are air, carbon monoxide, hydrogen and residues of starting products or of by-products such as methanol, methane, ethylene, higher olefins, methyl formate, dimethyl ether and acetals and semiacetals of formaldehyde. In many cases, formose mixtures show a tendency towards browning reactions in the presence of oxygen, so that oxygen-free synthesis gases are preferably used in accordance with the invention.

However, the synthesis gases formed during the commercial production of formaldehyde can be used in crude form, i.e. without any preliminary purification. This is, particularly advantageous for economic reasons. Surprisingly, the large quantities of carbon dioxide present in the synthesis gases do not interfere with formose formation. Since most of the above-mentioned metals (e.g. the catalysts preferably used in the invention like calcium and lead) form insoluble carbonates in medium pH-ranges, it had been expected that these catalysts would be rapidly deactivated where formaldehyde-containing synthesis gases are used as the formaldehyde source. However, it has surprisingly been found that, in spite of the very large quantities of carbon dioxide present (frequently an approximately 300 to 600-fold molar excess of carbon dioxide relative to the metal catalyst) there is no interference with the catalytic activity of the metal ions. This can presumably be attributed to the surprisingly high ability of formose to form extremely stable complexes with a variety of different metal ions.

The condensation of formaldehyde using synthesis gases may be carried out both in batches and, preferably, continuously. The absorbents used for the formaldehyde in the synthesis gases are water and/or monohydric or polyhydric alcohols with a molecular weight of from 32 to 400 and/or polyhydroxyl compounds with a molecular weight of from 400 to 10,000. These absorption liquids may contain up to 10% by weight, based on the formaldehyde to be absorbed, of co-catalysts based on compounds capable of enediol formation. The catalyst itself may be added in dissolved or suspended form to the absorption liquid. The condensation process is generally carried out under normal pressure. If, for reasons associated with the intended applications of the products, strong caramelization and other secondary reactions such as rearrangements and sugar condensations, are desirable, it is also possible to work at elevated pressure and at temperatures of from 110° to 150° C. Pressures of from 5 to 150 bars, more especially from 10 to 70 bars, are preferred in this connection. However, the condensation of formaldehyde from synthesis gases may also be carried out under reduced pressure with quenched synthesis gases. The temperature of the absorption liquid is generally in the range from 70° to 110° C., preferably in the range from 80° to 100° C. In special cases, however, it may be preferred to allow formose formation to take place at lower temperatures, for example between 10° and 55° C., preferably between 10° and 50° C. The synthesis gases are generally introduced into the absorption liquid at a temperature of from 90° to 250° C., preferably at a temperature of from 100° to 140° C. The heat reservoir of the synthesis gases, which accumulate during their production at a temperature of approximately 300° C. may be utilized in an energy-saving manner for partially dehydrating the products of the process. The effect of the large volumes of inert gas present in the synthesis gas as entraining agents for water is of particular advantage in this connection.

In cases where the condensation of formaldehyde is carried out in batches, the synthesis gas is passed through a column filled with the stationary absorption liquid. In order to accelerate the exchange of material between the two phases, the absorption column preferably contains a large-surface tower packing known per se, for example in the form of Raschig rings, saddle rings, sieve plates or fine-mesh wire gauzes. The fixed catalysts based on ion exchangers which are preferably used in the invention may of course also serve simultaneously as the tower packing in the absorption column. The synthesis gas is passed through the absorption column until the absorption liquid has been saturated, i.e. until relatively large quantities of formaldehyde together with the inert gases flow off from the head of the column. Since the water present in the synthesis gases is also taken up at the same time as the formaldehyde by the absorption liquid, even in cases where alcohols are used as the absorption liquid, a mixture of the alcohol used as absorption liquid, an aqueous formaldehyde solution, and semiacetals of formaldehyde with the alcohol which are in dissociation equilibrium with the free alcohol and the aqueous formaldehyde solution is obtained at the end of the absorption process. In cases where the absorption liquid already contains the catalyst necessary for the process according to the invention, formose formation actually begins during absorption of the formaldehyde. The advantage of this procedure is that a greater quantity of formaldehyde can be taken up by a given volume of absorption liquid. However, it is of course possible to introduce the synthesis gas into a catalyst-free absorption liquid up to saturation point and only then to start the reaction by adding the catalyst.

However, it is particularly economical to carry out the condensation of formaldehyde from synthesis gases continuously. To this end the aqueous solution of the cocatalyst and/or the alcohol or polyhydroxyl compound used as absorption liquid is kept circulating and the absorption liquid is best passed in countercurrent to the hot synthesis gases. In this preferred procedure, too, it is advantageous to use packed columns, bubble-tray columns, sieve-plate columns or trickle-film columns known per se as the absorption column. Bubble columns may of course also be used for the process according to the invention.

Both in the continuous and in the batch variant of the process, the average residence time of the formaldehyde-containing synthesis gas in the absorption columns is generally between 0.3 and 10 seconds and preferably between 0.6 and 3 seconds.

FIG. 1 shows in highly simplified, diagrammatic form an apparatus suitable for carrying out the continuous variation of the process. The hot formaldehyde-containing synthesis gas is introduced at 1 into the absorption column A filled with absorption liquid. Additives such as, for example, catalyst, monohydric or polyhydric alcohols, relatively high molecular weight polyhydroxyl compound, inorganic or organic base, etc., may be introduced at 2. The absorption liquid is circulated by the pump B and passed in countercurrent to the synthesis gas. The steam-containing gases freed from formaldehyde leave the absorption column at 3. C represents a heatable and coolable residence vessel in which formose formation may take place, in the presence of catalyst. Part of the formaldehyde-containing absorption liquid is continuously run off at 4 and passed through another residence vessel D into which additives such as, for example, catalyst, co-catalyst, bases, acids, etc., may again be added at 5. Most of the formaldehyde condensation reaction generally takes place in the residence vessel D. The reaction product leaves the apparatus at 6.

In the continuous variation of the process for producing formose from formaldehyde-containing synthesis gases both the metal catalyst and, optionally, a compound capable of enediol formation as co-catalyst may again be added to the absorption liquid, as mentioned above. In this case, the condensation of the formaldehyde into formose actually begins at the same time as absorption of the formaldehyde. It is also possible, however, to add the catalyst and, optionally, the co-catalyst after the product has been removed, i.e. for example at 5 in FIG. 1, so that formose formation takes place almost completely outside the circuit of the absorption liquid.

In the continuous variation of the process, it is necessary to differentiate between the starting phase and the stationary phase. During the starting phase of the process, the synthesis gas is passed through the recirculated absorption liquid which is an aqueous solution of co-catalyst and/or a monohydric or, preferably, polyhydric alcohol or relatively high molecular weight polyhydroxyl compound. During this starting phase, the concentration of formaldehyde and water and optionally, where catalysts are present in the absorption liquid, of formose increases until finally a flow equilibrium is reached between the quantity of formaldehyde introduced by the synthesis gas and the quantity of formaldehyde (or formose) removed from the circuit. The duration of this starting phase is determined not only by the volume of the absorption column, pump, pipes and, optionally, the residence vessel, but also and, above all, by the composition of the absorption liquid during start-up. The starting phase may be considerably shortened by adding at the outset as much formalin solution and, optionally, formose to the absorption liquid as corresponds to the stationary phase. Depending upon the starting composition of the absorption liquid and the dimensions of the reactor, the starting phase lasts from a few seconds to about 2 hours and generally from 1 to 60 minutes.

The stationary formaldehyde concentration in the absorption liquid is, of course, determined on the one hand by the procedure adopted (formose formation actually taking place at the same time as absorption of the formaldehyde or alternatively outside the absorption apparatus) and on the other hand by the process parameters which are the volume of synthesis gas used per unit of time; the overall volume of the absorption liquid; the average residence time of the absorption liquid in the absorption column; temperature; pressure; hydroxyl functionality of the alcohol and concentration of the catalyst or co-catalyst used, if any. In general, however, the stationary formaldehyde concentration in the absorption column, where catalysts and optionally co-catalysts are present in the absorption liquid, amounts to between 0.5 and 10% by weight, especially between 1 and 5% by weight. If the catalyst is added to the absorption liquid outside the circuit, the stationary formaldehyde concentration in the circuit is, of course, also increased and generally amounts to between 2 and 70% by weight, preferably to between 10 and 50% by weight.

At the preferred process temperatures of about 80° to 100° C., approximately one third of the water emanating from the synthesis gas is evaporated by the heat of reaction liberated or entrained by the inert gases in the stationary phase. The residual water in the synthesis gases provides for a constant water content in the absorption liquid and during condensation of the formaldehyde. After the stationary phase has been reached, therefore, it is only necessary to add to the circuit, apart from the synthesis gas, such a quantity of monohydric or polyhydric low molecular weight alcohol or relatively high molecular weight polyhydroxyl compound and, optionally, catalyst, co-catalyst and inorganic or organic base to maintain the required pH-range, as is continuously removed from the circuit.

If formose formation takes place completely or partly outside the circuit of the absorption liquid, the condensation reaction of the formaldehyde may be allowed to take place in a continuous cascade of stirrer-equipped vessels. By varying the residence time in the individual stirrer-equipped vessels of the cascade, it is possible exactly to adjust the residual formaldehyde content in this variation of the process. The product distribution of the reaction mixture and the average hydroxyl functionality of the mixture of polyhydric alcohols obtainable therefrom by reduction may readily be varied within wide limits and reproduced in this way. It is also possible for condensation of the formaldehyde into formose to be carried out in tubular coil reactors rather than in cascades of stirrer-equipped vessels, under pressure of approximately 5 to 150 bars, preferably 10 to 70 bars and at elevated temperatures of preferably 105° to 140° C. The dimensions of the tubular coil reactor must, of course, take into account the cubic expansion co-efficient of the formose mixtures formed in order to avoid producing extremely high liquid pressures. Suitable tubular coil reactors are described, for example, in German Auslegeschriften Nos. 1,667,051 and 1,921,045.

Polyethers obtained in accordance with the present invention by alkoxylating reduced formose mixtures having a hydroxyl functionality of about 5 to 6 are particularly suitable for the production of rigid polyurethane foams. As explained above, however, it is even possible to obtain other component distributions of the starter mixtures by terminating the condensation of formaldehyde at various residual formaldehyde contents.

Thus, termination of the condensation reaction at a formaldehyde content of from 2 to 2.5% produces a mixture of polyhydric alcohols, hydroxyaldehydes and hydroxyketones, from which a starter mixture having an average hydroxyl functionality of approximately 4.6 is formed by hydrogenation. Propoxylation of this starter mixture gives a polyether which is also eminently suitable for the production of rigid polyurethane foams.

Different component distributions having a lower average hydroxyl functionality are obtained by terminating the condensation reaction at residual formaldehyde contents of greater than 2.5. These starter mixtures of low hydroxyl functionality may be reacted to form polyethers which are suitable for the production of flexible polyurethane foams. Their viscosity is lower than that of standard commercial-grade polyethers based on trimethylol propane or glycerol having the same functionality. This leads to an improved property level of the polyurethane foams produced therefrom. By virtue of the lower viscosity, the fluidity of the foam-forming reaction mixture is distinctly improved. This leads, for example, to more uniform filling of the foaming mold in cases where it is intended to use the polyethers for producing foamed moldings.

By mixing the mixtures of polyhydric alcohols, produced by the condensation of formaldehyde hydrate, followed by hydrogenation, with bifunctional or trifunctional low molecular weight alcohols, the functionality of the starter mixture may be varied as required in cases where it is desired to provide the resulting polyethers with certain service properties.

According to the present invention, additional bifunctional or trifunctional polyols include, for example, ethylene glycol, propylene glycol, 1,4-butane diol, diethylene glycol, dipropylene glycol, triethylene glycol, tetraethylene glycol, dibutylene glycol, trimethylol propane or glycerol. Amines and/or ethanolamines may also be used as a mixing component. Examples of suitable amines and ethanolamines include mono-, di- and tri-ethanolamine; mono-, di- and tri-isopropanolamine; N-alkanolamines, such as N-methyl diethanolamine and N-ethyl diethanolamine; and lower aliphatic monoamines and polyamines, such as ethylamine, ethylene diamine, diethylene triamine and triethylene tetramine.

The mixtures of polyhydric alcohols, produced by the condensation of formaldehyde hydrate, followed by reduction of the condensation products, are moderately viscous to low viscous liquids which may readily be delivered and metered through pumps and pipes at room temperature or at moderately elevated temperatures. This is a considerable advantage over conventional processes for the production of polyethers where, for example, sorbitol or sucrose have to be introduced in solid form. Such processes involve considerable outlay both in terms of apparatus and in terms of personnel.

The production of polyethers, in accordance with the present invention, is carried out in known manner by initially adding a small quantity of alkali metal hydroxide or another known catalyst to the mixture of polyhydric alcohols under a nitrogen atmosphere at a temperature of from about 20° to 110° C., preferably from 50° to 90° C. The readily stirrable mixture is then heated to the reaction temperature of from about 85° to 130° C., preferably from 95° to 115° C., and subsequently reacted with alkylene oxide under pressures of from 0.2 to 4.0 atms gauge, preferably from 0.3 to 2.0 atms gauge. The reaction temperature is maintained at from 85° to 130° C., preferably from 95° to 115° C. by heating or cooling the reaction mixture. On completion of the alkylene oxide addition, the alkaline polymer is neutralized using dilute mineral acid. An anti-oxidant, such as 2,6-di-tert.-butyl-p-cresol, is optionally added to the neutralized product. After the water has been distilled off, the salts which have precipitated are removed by filtration.

In the process according to the present invention, addition of the starter mixture is particularly easy because, in every case, the starter mixture is a liquid of moderate or low viscosity which may be directly pumped through pipes.

Polyaddition of the alkylene oxide is preferably carried out in the presence of alkali metal hydroxides, preferably sodium hydroxide or potassium hydroxide, as catalyst. In one preferred embodiment, potassium hydroxide is used in the form of an approximately 50% aqueous solution, the quantity of potassium hydroxide amounting to from 1.0 to 50%, preferably from 1.0 to 20% of the weight of the starter mixture. However, the reaction may also be carried out in the presence of acids, such as phosphoric acid, or Lewis acids, such as boron tri-fluoride, as catalyst.

The alkylene oxide used in the process include ethylene oxide, propylene oxide, butylene oxide, tetrahydrofuran, styrene oxide or epichlorohydrin. Other oxiranes, such as vinyl oxirane, may also be used. These alkylene oxides used for the alkoxylation reaction may be used either individually or in admixture with one another. It is also possible to use different alkylene oxides in succession in a reaction mixture for producing so-called "graft polyethers". Ethylene oxide and/or propylene oxide are preferably used in accordance with the present invention.

The reaction temperatures may be varied within a relatively wide range. In general, the reaction is carried out at temperatures of from 85° to 130° C., preferably from 95° to 115° C. The reaction with the alkylene oxides is carried out at elevated pressure, generally under pressures of from 0.2 to 4.0 atmospheres gauge, preferably from 0.3 to 2.0 atmospheres gauge.

The polyethers produced in accordance with the present invention are clear, colorless to yellowish liquids whose viscosity varies according to hydroxyl number and functionality from 400 cp/25° C. (in the case of polyethers having a functionality of 3 and OH-numbers of from 55 to 60) to approximately 30,000 cP/25° C. (for example in the case of polyethers having a functionality of 4.6 and an OH-number of 556). The viscosities of the polyethers obtained are distinctly less than standard commercial-grade polyethers of comparable functionality and hydroxyl number, as may be seen from the following Examples and Comparison Examples. By varying the hydroxyl number and component distribution of the starter mixtures and also the diols and/or triols and/or amines optionally added, it is possible to produce products whose viscosity is optimally adapted to the particular application envisaged.

The polyether polyols produced in accordance with the present invention may be reacted with polyisocyanates, optionally together with other known relatively high molecular weight compounds containing isocyanate-reactive groups and/or chain extending agents, to form homogeneous or cellular polyurethane plastics.

Accordingly, the present invention also relates to a process for producing cellular or non-cellular polyurethane plastics by reacting:

(a) polyisocyanates; with
(b) relatively high molecular weight compounds containing isocyanate-reactive hydrogen atoms; and, optionally,
(c) chain extenders; optionally in the presence of
(d) blowing agents, catalysts and other known additives, wherein component (b) is a polyether polyol produced in accordance with the present invention.

Starting components suitable for the production of polyurethane plastics include aliphatic, cycloaliphatic, araliphatic, aromatic and heterocyclic polyisocyanates of the type described, for example, by W. Siefken in Justus Liebigs Annalen der Chemie, 562, pages 75 to 136. Examples include ethylene diisocyanate; 1,4-tetramethylene diisocyanate; 1,6-hexamethylene diisocyanate; 1,12-dodecane diisocyanate; cyclobutane-1,3-diisocyanate; cyclohexane-1,3- and 1,4-diisocyanate, also mixtures of these isomers; 1-isocyanato-3,3,5-trimethyl-5-isocyanatomethyl cyclohexane (DAS No. 1,202,785, U.S. Pat. No. 3,401,190); 2,4- and 2,6-hexahydrotolylene diisocyanate, also mixtures of these isomers; hexahydro-1,3-and/or 1,4-phenylene diisocyanate; perhydro-2,4'- and/or -4,4'-diphenyl methane diisocyanate;

1,3- and 1,4-phenylene diisocyanate; 2,4- and 2,6-tolylene diisocyanate, also mixtures of these isomers; diphenyl methane-2,4'- and/or -4,4'-diisocyanate; naphthylene-1,5-diisocyanate; triphenyl methane-4,4', 4"-triisocyanate; polyphenyl polymethylene polyisocyanates, of the type which may be obtained by condensing aniline with formaldehyde, followed by phosgenation, and which are described, for example, in British Pat. Nos. 874,430 and 848,671; m- and p-isocyanatophenyl sulphonyl isocyanates according to U.S. Pat. No. 3,454,606; perchlorinated aryl polyisocyanates of the type described, for example, in German Auslegeschrift No. 1,157,601 (U.S. Pat. No. 3,277,138); polyisocyanates containing carbodiimide groups of the type described in German Pat. No. 1,092,007 (U.S. Pat. No. 3,152,162); diisocyanates of the type described in U.S. Pat. No. 3,492,330; polyisocyanates containing allophanate groups of the type described, for example, in British Pat. No. 994,890, Belgian Pat. No. 761,626 and published Dutch Patent Application No. 7,102,524; polyisocyanates containing isocyanurate groups of the type described, for example, in U.S. Pat. No. 3,001,973, German Pat. Nos. 1,022,789; 1,222,067 and 1,027,394 and in German Offenlegungsschriften No. 1,929,034 and 2,004,048; polyisocyanates containing urethane groups of the type described, for example, in Belgian Pat. No. 752,261 or in U.S. Pat. No. 3,394,164; polyisocyanates containing acylated urea groups according to German Pat. No. 1,230,778; polyisocyanates containing biuret groups of the type described, for example, in German Pat. No. 1,101,394 (U.S. Pat. Nos. 3,124,605 and 3,201,372) and in British Pat. No. 889,050; polyisocyanates obtained by telomerization reactions of the type described, for example, in U.S. Pat. No. 3,654,106; polyisocyanates containing ester groups of the type described, for example, in British Pat. Nos. 965,474 and 1,072,956, in U.S. Pat. No. 3,567,763 and in German Pat. No. 1,231,688; reaction products of the above-mentioned isocyanates with acetals according to German Pat. No. 1,072,385; and polyisocyanates containing polymeric fatty acid radicals according to U.S. Pat. No. 3,455,883.

It is also possible to use the isocyanate group-containing distillation residues accumulating in the production of isocyanates on a commercial scale, optionally in solution in one or more of the aforementioned polyisocyanates. It is also possible to use mixtures of the aforementioned polyisocyanates.

In general, it is particularly preferred to use the commercially readily available polyisocyanates, for example, 2,4- and 2,6-tolylene diisocyanate and mixtures of these isomers ("TDI"); polyphenyl polymethylene polyisocyanates of the type obtained by condensing aniline with formaldehyde, followed by phosgenation ("crude MDI"); and polyisocyanates containing carbodiimide groups, urethane groups, allophanate groups, isocyanurate groups, urea groups or biuret groups ("modified polyisocyanates").

Starting components which may optionally be used in addition to the polyethers produced in accordance with the present invention are compounds containing at least two isocyanate-reactive hydrogen atoms and generally having a molecular weight of from 400 to 10,000. In addition to compounds containing amino groups, thiol groups or carboxyl groups, compounds of this type are preferably polyhydroxyl compounds, particularly compounds containing from two to eight hydroxyl groups, particularly those having molecular weights of from 800 to 10,000, preferably from 1,000 to 6,000. These include, for example, polyesters, polyethers, polythioethers, polyacetals, polycarbonates and polyester amides containing at least 2, generally from 2 to 8, but preferably from 2 to 4 hydroxyl groups, of the type commonly used for the production of homogeneous and cellular polyurethanes.

Examples of suitable polyesters containing hydroxyl groups are reaction products of polyhydric, preferably dihydric, and, optionally, trihydric alcohols with polybasic, preferably dibasic, carboxylic acids. Instead of the free polycarboxylic acids, the corresponding polycarboxylic acid anhydrides or corresponding polycarboxylic acid esters of lower alcohols or mixtures thereof may also be used for the production of the polyesters. The polycarboxylic acids may be aliphatic, cycloaliphatic, aromatic and/or heterocyclic, and may optionally be substituted, for example, by halogen atoms, and/or may be unsaturated.

Examples of these polycarboxylic acids are: succinic acid, adipic acid, suberic acid, azelaic acid, sebacic acid, phthalic acid, isophthalic acid, trimellitic acid, phthalic acid anhydride, tetrahydrophthalic acid anhydride, hexahydrophthalic acid anhydride, tetrachlorophthalic acid anhydride, endomethylene tetrahydrophthalic acid anhydride, glutaric acid anhydride, maleic acid, maleic acid anhydride, fumaric acid, dimeric and trimeric fatty acids, such as oleic acid, optionally in admixture with monomeric fatty acids, terephthalic acid dimethyl ester, terephthalic acid-bis-glycol ester. Examples of suitable polyhydric alcohols are: ethylene glycol, 1,2-and 1,3-propylene glycol, 1,4- and 2,3-butylene glycol, 1,6-hexanediol, 1,8-octanediol, neopentyl glycol, cyclohexane dimethanol (1,4-bis-hydroxy methyl cyclohexane), 2-methyl-1,3-propane diol, glycerol, trimethylol propane, 1,2,6-hexane triol, 1,2,4-butane triol, trimethylol ethane, pentaerythritol, quinitol, mannitol and sorbitol, methyl glycoside, also diethylene glycol, triethylene glycol, tetraethylene glycol, polyethylene glycols, dipropylene glycol, polypropylene glycols, dibutylene glycol and polybutylene glycols. The polyesters may contain terminal carboxyl groups. Polyesters of lactones, for example δ-caprolactone, or hydroxy carboxylic acids, for example ω-hydroxy caproic acid, may also be used.

Polyethers modified by vinyl polymers, of the type formed, for example, by polymerizing styrene and acrylonitrile in the presence of polyethers (U.S. Pat. Nos. 3,383,351; 3,304,273; 3,523,093 and 3,110,695: German Pat. No. 1,152,536), are also suitable, as are polybutadienes containing OH-groups.

Among the polythioethers, reference is made in particular to the condensation products of thiodiglycol with itself and/or with other glycols, dicarboxylic acids, formaldehyde, amino carboxylic acids or amino alcohols. Depending upon the co-components, these products are polythio mixed ethers, polythioether esters, polythioether ester amides.

Suitable polyacetals are, for example, those compounds which may be obtained from glycols, such as diethylene glycol, triethylene glycol, 4,4'-dioxethoxy diphenyl dimethyl methane and hexane diol, by reaction with formaldehyde. Polyacetals suitable for the purposes of the present invention may also be obtained by polymerizing cyclic acetals.

Suitable polycarbonates containing hydroxyl groups are those known compounds obtainable, for example, by reacting diols, such as 1,3-propane diol, 1,4-butane diol and/or 1,6-hexane diol, diethylene glycol, triethylene glycol and tetraethylene glycol, with diaryl carbonates, for example, diphenyl carbonate, or with phosgene.

Examples of the polyester amides and polyamides are the predominantly linear condensates obtained from polybasic, saturated and unsaturated carboxylic acids and the anhydrides thereof and polyfunctional saturated and unsaturated amino alcohols, diamines, polyamines and mixtures thereof.

Polyhydroxyl compounds already containing urethane or urea groups and optionally modified natural polyols, such as castor oil, carbohydrates or starch, may also be used. Addition products of alkylene oxides with phenol-formaldehyde resins or even with urea-formaldehyde resins may also be used in accordance with the present invention.

Representatives of these compounds used in accordance with the present invention are described, for example, in High Polymers, Vol. XVI, "Polyurethanes, Chemistry and Technology", by Saunders-Frisch, Interscience Publishers, New York, London, Vol. I, 1962, pages 32 to 42 and pages 44 to 54, and Vol. II, 1964, pages 5—6 and 198—199, and in Kunststoff-Handbuch, Vol. VII, Vieweg-Höchtlen, Carl-Hanser-Verlag, Munich, 1966, for example, on pages 45 to 71.

Other starting components which may optionally be used in accordance with the present invention are compounds containing at least two isocyanate-reactive hydrogen atoms and having a molecular weight of from 32 to 400. In this case, too, the compounds in question are compounds containing hydroxyl groups and/or amino groups and/or thiol groups and/or carboxyl groups, preferably compounds containing hydroxyl groups and/or amino groups which are used as chain-extenders or cross-linkers. These compounds generally contain from 2 to 8 preferably 2 or 3 isocyanate-reactive hydrogen atoms.

Examples of such compounds are: ethylene glycol, 1,2-propylene glycol and 1,3-propylene glycol, 1,4-butylene glycol and 2,3-butylene glycol, 1,5-pentane diol, 1,6-hexane diol, 1,8-octane diol, neopentyl glycol, 1,4-bis-hydroxymethyl cyclohexane, 2-methyl-1,3-propane diol, glycerol, trimethylol propane, 1,2,6-hexane triol, trimethylol ethane, pentaerythritol, quinitol, mannitol and sorbitol, diethylene glycol, triethylene glycol, tetraethylene glycol, polyethylene glycols having a molecular weight of up to 400, dipropylene glycol, polypropylene glycols having a molecular weight of up to 400, dibutylene glycol, polybutylene glycols having a molecular weight of up to 400, 4,4'-dihydroxy diphenyl propane, dihydroxy methyl hydroquinone, ethanolamine, diethanolamine, triethanolamine, 3-aminopropanol, ethylene diamine, 1,3-diaminopropane, 1-mercapto-3-aminopropane, 4-hydroxy- or -aminophthalic acid, succinic acid, adipic acid, hydrazine, N,N'-dimethyl hydrazine, 4,4'-diaminodiphenyl methane, tolylene diamine, methylene-bis-chloroaniline, methylene-bis-anthranilic acid ester, diaminobenzoic acid esters and the isomeric chlorophenylene diamines.

In this case, too, it is possible to use mixtures of different compounds containing at least two isocyanate-reactive hydrogen atoms and having a molecular weight of from 32 to 400.

It is, of course, also possible to use the starter mixtures employed in accordance with the present invention as chain-extenders.

However, it is also possible in accordance with the present invention to use polyhydroxyl compounds containing high molecular weight polyadducts or polycondensates in finely dispersed or dissolved foam. Modified polyhydroxyl compounds such as these are obtained by carrying out polyaddition reactions (for example, reactions between polyisocyanates and aminofunctional compounds) or polycondensation reactions (for example, between formaldehyde and phenols and/or amines) directly in situ in the above-mentioned compounds containing hydroxyl groups. Processes such as these are described, for example, in German Auslegeschriften Nos. 1,168,075 and 1,260,142 and in German Offenlegungsschriften Nos. 2,324,134; 2,423,984; 2,512,385; 2,513,815; 2,550,796; 2,550,797; 2,550,833 and 2,550,862. However, it is also possible, in accordance with U.S. Pat. No. 3,869,413 or German Offenlegungsschrift No. 2,550,860, to mix an aqueous polymer dispersion with a polyhydroxyl compound and subsequently to remove the water from the mixture.

In cases where modified polyhydroxyl compounds of the type mentioned above are used as starting components in the polyisocyanate polyaddition process, polyurethane plastics having considerably improved mechanical properties are formed in many cases.

Water and/or readily volatile organic substances may be used as blowing agents in the production of foamed polyurethane plastics. Suitable organic blowing agents include, for example, acetone, ethyl acetate, halogen-substituted alkanes, such as methylene chloride, chloroform, ethylidene chloride, vinylidene chloride, monofluorotrichloromethane, chlorodifluoromethane, dichlorodifluoromethane, butane, hexane, heptane or diethyl ether. A blowing effect may also be obtained by adding compounds which decompose at temperatures above room temperature giving off gases, for example, nitrogen, for example, azocompounds, such as azoisobutyronitrile. Other examples of blowing agents and information on the use of blowing agents may be found in Kunststoff-Handbuch, Vol. VII, by Vieweg and Höchtlen, Carl-Hanser-Verlag, Munich 1966, for example, on pages 108 and 109, 453 to 455 and 507 to 510.

According to the present invention, catalysts are also frequently used. Examples of suitable known catalysts are, for example, tertiary amines, such as triethyl amine, tributyl amine, N-methyl morpholine, N-ethyl morpholine, N-co-comorpholine, N,N,N',N'-tetramethyl ethylene diamine, 1,4-diazabicyclo-(2,2,2)-octane, N-methyl-N'-dimethyl aminoethyl piperazine, N,N-dimethyl benzyl amine, bis-(N,N-diethyl amino ethyl)-adipate, N,N-diethyl benzyl amine, pentamethyl diethylene triamine, N,N-dimethyl cyclohexyl amine, N,N,N',N'-tetramethyl-1,3-butane diamine, N-N-dimethyl-$\beta$-phenyl ethyl amine, 1,2-dimethyl imidazole and 2-methyl imidazole. Other suitable catalysts are known Mannich bases of secondary amines, such as dimethyl amine, and aldehydes, preferably formaldehyde, or ketones, such as acetone, methyl ethyl ketone or cyclohexanone, and phenols, such as phenol, nonylphenol or bis-phenol.

Examples of tertiary amine catalysts containing isocyanate-reactive hydrogen atoms are triethanolamine, triisopropanolamine, N-methyl diethanolamine, N-ethyl diethanolamine, N,N-dimehyl ethanolamine, also the reaction products thereof with alkylene oxides, such as propylene oxide and/or ethylene oxide.

Other suitable catalysts are silaamines containing carbon-silicon bonds of the type described, for example, in German Pat. No. 1,229,290 (corresponding to U.S. Pat. No. 3,620,984), for example, 2,2,4-trimethyl-2- silamorpholine and 1,3-diethyl aminomethyl tetramethyl disiloxane.

Other suitable catalysts are nitrogen-containing bases, such as tetraalkyl ammonium hydroxides, also alkali metal hydroxides, such as sodium hydroxide, alkali metal phenolates, such as sodium phenolate, or alkali metal alcoholates, such as sodium methylate. Hexahydrotriazines may also be used as catalysts.

According to the present invention, organometallic compounds, especially organotin compounds, may also be used as catalysts.

Preferred organotin compounds are tin(II) salts of carboxylic acids, such as tin(II) acetate, tin(II) octoate, tin(II) ethyl hexoate and tin(II) laurate, and the tin(IV) compounds, such as dibutyl tin oxide, dibutyl tin dichloride, dibutyl tin diacetate, dibutyl tin dilaurate, dibutyl tin maleate or dioctyl tin diacetate. It is, of course, possible to use all the above-mentioned catalysts in the form of mixtures.

Further representatives of catalysts suitable for use in accordance with the present invention and details on the way in which the catalysts work may be found in Kunststoff-Handbuch, Vol. VII, by Vieweg and Höchtlen, Carl-Hanser-Verlag, Munich, 1966, for example on pages 96 to 102.

The catalysts are generally used in quantities of from about 0.001 to 10%, by weight, based on the quantity of compounds having at least two isocyanate-reactive hydrogen atoms and a molecular weight of from 400 to 10,000.

According to the present invention, surface-active additives, such as emulsifiers and foam stabilizers, may also be used. Such emulsifiers include the sodium salts of castor oil sulphonates or salts of fatty acids with amines, such as diethyl amine/oleic acid or diethanolamine/stearic acid. Alkali metal or ammonium salts of sulphonic acids, such as those of dodecyl benzene sulphonic acid or dinaphthyl methane disulphonic acid, or of fatty acids, such as ricinoleic acid, or of polymeric fatty acids, may also be used as surface-active additives.

Particularly suitable foam stabilizers are polyether siloxanes, especially water-soluble types. These compounds generally have a structure in which a copolymer of ethylene oxide and propylene oxide is attached to a polydimethyl siloxane radical. Foam stabilizers of this type are described, for example, in U.S. Pat. Nos. 2,834,748; 2,917,480 and 3,629,308.

According to the present invention, it is also possible to use reaction retarders, e.g., substances having an acid reaction, such as hydrochloric acid or organic acid halides; known cell regulators, such as paraffins or fatty alcohols or dimethyl polysiloxanes; pigments; dyes; known flameproofing agents, for example, trischloroethyl phosphate, tricresyl phosphate or ammonium phosphate and polyphosphate; stabilizers against the effects of ageing and weather; plasticizers; substances having fungistatic and bacteriostatic effects; and fillers, such as barium sulphate, kieselguhr, carbon black or prepared chalk.

Other examples, of the surface-active additives and foam stabilizers optionally used in accordance with the present invention and of cell regulators, reaction retarders, stabilizers, flameproofing substances, plasticizers, dyes fillers and substances having fungistatic and bacteriostatic effects and also details on the way in which these additives are to be used and how they work, may be found in Kunststoff-Handbuch, Vol. VII, published by Vieweg and Höchtlen, Carl-Hanser-Verlag, Munich, 1966, for example, on pages 103 to 113.

According to the present invention, the reaction components are reacted by the known single-stage process, by the prepolymer process or by the semiprepolymer process, in many cases using machines of the type described, for example, in U.S. Pat. No. 2,764,565. Particulars of processing equipment suitable for use in accordance with the invention may be found, for example, on pages 121 and 205 of Kunststoff-Handbuch, Vol. VII, published by Vieweg and Höchtlen, Carl-Hanser-Verlag, Munich 1966.

In the production of foams, the foaming reaction is preferably carried out in molds in accordance with the present invention. To this end, the reaction mixture is introduced into a mold. Suitable mold materials are metals, for example, aluminum, or plastics, for example, epoxide resins. Inside the mold the foamable reaction mixture foams and forms the molding. In-mold foaming may be carried out in such a way that the molding has a cellular structure at its surface, or even in such a way that the molding has a compact skin and a cellular core. According to the present invention, it is possible in this connection to introduce such a quantity of foamable reaction mixture into the mold that the foam formed just fills the mold. However, it is also possible to introduce into the mold more foamable reaction mixture than is required for filling the mold with foam. This technique is known as "overcharging" and is known, for example, from U.S. Pat. Nos. 3,178,490 and 3,182,104.

Known "external release agents", such as silicone oils, are frequently used for in-mold foaming. However, it is also possible to use so-called "internal release agents", optionally in admixture with external release agents, such as are known, for example, from German Offenlegungsschriften Nos. 2,121,670 and 2,307,589.

According to the present invention, cold-hardening foams may also be produced (cf. British Pat. No. 1,162,517, German Offenlegungsschrift No. 2,153,086).

However, it is, of course, also possible to produce foams by block foaming or by the known laminator process.

In summary, it may be said that the polyethers produced in accordance with the present invention have the following major advantages over conventional polyethers:

For the same functionality and for a comparable hydroxyl number, the polyethers according to the present invention are less viscous than conventional polyethers, such as trimethylol propane polyethers or polyethers based on sucrose or sucrose/polyol mixtures. This property enables the polyethers to be reacted under favorable conditions to form polyurethane foams. The low viscosity provides for an increased throughput to the mixing heads of conventional foaming machines and also provides for more complete, quicker admixture with the isocyanate component. Accordingly, the reaction mixture may be applied relatively quickly or more reaction mixture may be applied and, at the same time, distributed more uniformly.

The low viscosity of the polyethers according to the present invention also provides the reaction mixtures with improved fluidity during the foaming process. In this way, the resulting polyurethane foams have a more uniform distribution of gross density. This, in turn, is reflected in greater compressive strength.

For the same viscosity of the reaction mixture, it is possible to use a more highly functional polyether which leads to quicker hardening of the foam.

Production of the polyethers on a commercial scale is also simplified. The starter mixtures used in accordance with the present invention are liquids of moderate to low viscosity, even in the absence of water or low viscosity polyols. For example, a mixture having an average functionality of 4.6 has a viscosity of 1195 cP at 80° C. and a viscosity of 324 cP at 100° C. Accordingly, the starter mixtures may always be metered and pumped without difficulty. They may also be satisfactorily stirred, even in admixture with alkali metal hydroxides. Secondary reactions which occur as a result of poor stirring of the reaction mixtures, such as caramelization, carbonization of the formation of inner ethers, are avoided.

Mixtures of the starter components of the present invention with low molecular weight polyhydric alcohols are distinguished by a lower viscosity than starters of comparable functionality, such as glycerol or trimethylol propane. For example, the viscosity of a mixture of polyhydric alcohols from the condensation of formaldehyde, adjusted to an average functionality of 3.0 by the addition of ethylene glycol, is distinctly lower, i.e., 790 cp a 20° C., than the viscosity of glycerol. Trimethylol propane, which is also frequently used as a starter molecule for polyalkylene glycol ethers, is solid under these conditions.

The apparatus used for the following Examples was an autoclave provided with a heating and cooling system, a stirrer, a means for displacing the air present (for example, a vacuum connection and a nitrogen inlet pipe), means for the azeotropic removal of water and means for metering the alkylene oxide.

The process according to the present invention is illustrated by the following Examples in which the figures quoted represent parts, by weight, and %, by weight, unless otherwise indicated.

COMPARISON EXAMPLE 1

A polyol formulation is produced from 75 parts of a standard commercial-grade polyether, obtained by propoxylating a mixture of sucrose, propylene glycol and water (OH-number 380; viscosity 12,000 mPas/25° C.), 10 parts of castor oil, 15 parts of diethanolaminomethane phosphonic acid diethyl ester, 1.5 parts of a standard commercial-grade foam stabilizer based on a siloxane/oxyalkylene copolymer, 2.0 parts of dimethyl cyclohexylamine and 0.5 part of water.

112 parts of this polyol formulation are thoroughly mixed (using a high speed stirrer) with 33 parts of dichlorodifluoromethane and 120 parts of a commercial diphenyl methane diisocyanate having an isocyanate content of 31%. After an incubation time of about 20 seconds, a rigid yellow polyurethane foam having closed cells and a density of 29.0 kg/m$^3$ is formed.

EXAMPLE 1

(a) Production of a co-catalyst 3000 parts of a 37% aqueous formaldehyde solution (37 moles of formaldehyde) are heated to from 70° to 90° C. 30 parts (0.08 mole) of lead (II) acetate are added at that temperature. The mixture is then further heated to 100° C. and, at that temperature, is adjusted to a pH-value of 6.7 by the dropwise addition of a 15% Ca(OH)$_2$ suspension.

After 6 hours, the formaldehyde content has fallen to a value of 20% and the addition of Ca(OH)$_2$ is stopped. The pH-value of the reaction mixture then decreases slowly. After the pH-value has reached pH 5.7, the mixture is maintained at that value by the addition of more Ca(OH)$_2$ suspension. After another 7.5 hours, the residual formaldehyde content is 0.5% and the reaction mixture is cooled. An approximately 37% solution of a co-catalyst mixture of hydroxyaldehydes and hydroxyketones is obtained in which the molar ratio between the $C_3$-compounds and the $C_4$-compounds amounts to 0.75, the molar ratio between the $C_4$-compounds and the $C_5$-compounds to 0.23 and the molar ratio between the $C_5$-compounds and the $C_6$-compounds to 0.67. The solution may be directly used as a co-catalyst.

(b) Production of the polyol mixture 30,000 parts of a 37% aqueous formaldehyde solution (370 moles of formaldehyde) are heated to from 70° to 90° C. 150 parts (0.4 mole) of lead (II) acetate and 810 parts of a 37% aqueous solution of a co-catalyst mixture which was produced as described above and in which the molar ratio between the $C_3$-compounds and the $C_4$-compounds amounts to 0.75, the molar ratio between the $C_4$-compounds and the $C_5$-compounds to 0.23 and the molar ratio between the $C_5$-compounds and the $C_6$-compounds to 0.67, are then added at the above-mentioned temperature. The mixture is then further heated to from 90° to 95° C. After this temperature has been reached, the heating is discontinued. During the next 5 minutes, the pH-value of the solution is adjusted to 6.5 by the addition of about 2000 parts of 10% potassium hydroxide solution. During the exothermic reaction which begins immediately, the reaction temperature rises to from 98° to 99° C. and the reaction mixture begins to boil. By the continuous dropwise addition of KOH-solution, the pH-value is maintained at 6.5 until a conversion of 30% has been reached (formaldehyde content of the reaction mixture: 23.6%). The dropwise addition of KOH is then stopped. As a result, the pH-value of the mixture gradually falls. After a pH-value of 5.7 has been reached, the gently boiling reaction mixture is maintained at that pH-value by the dropwise addition of another 700 parts of 10% potassium hydroxide solution. After 20 minutes, the formaldehyde content has fallen to 16%, after 25 minutes to 13% and after 30 minutes to 8%. After another 10 minutes, the reaction mixture only contains 1.3% of formaldehyde. The reaction is then interrupted by cooling. After the temperature of the reaction mixture has fallen to 90° C., 50 parts of active carbon are added. 100 parts of potassium carbonate are added at 65° C. to precipitate the lead ions. After the lead carbonate has precipitated and the active carbon has been filtered off, a clear colorless solution is obtained, from which 11,713 parts of a colorless viscous mixture of polyhydric alcohols, hydroxyaldehydes and hydroxyketones containing 9.8% of water are obtained by concentration in a water jet vacuum at 40° C. A mixture of polyhydric alcohols is obtained therefrom by electrochemical reduction or catalytic hydrogenation. Analysis of the silylated polyhydric alcohols by gas chromatography reveals the following component distribution:

dihydric alcohols, 0.2%, by weight
trihydric alcohols, 2.6%, by weight
tetrahydric alcohols, 4.6%, by weight
pentahydric alcohols, 24.8%, by weight
hexahydric alcohols, 44.5%, by weight heptahydric and higher hydric alcohols, 23.5%, by weight This corresponds to an average hydroxyl functionality of 5.61.

(c) Process according to the present invention 1888 g of the above mixture of polyhydric alcohols and 600 g of toluene are initially introduced at room temperature. The air present in the reaction vessel is displaced by evacuating the reaction vessel twice and refilling it with nitrogen. After heating to 80° C., 80 g of 50% aqueous potassium hydroxide are added. This is followed by further heating. 52.8 g of water (water of solution and water of reaction from the potassium hydroxide) are distilled off azeotropically at from 100° to 115° C. On completion of distillation, 6112 g of propylene oxide are gradually introduced (500 g/hour) into the readily stirrable mixture at a temperature of from 100° to 105° C. and under a pressure of from 0.4 to 0.6 bar. The reaction temperature is maintained either by cooling or heating the reaction mixture as required. After the propylene oxide has been added, the reaction mixture is stirred for another 3 hours at from 100° to 105° C. Following the addition of 800 g of water, the alkaline polymer is neutralized using 284 g of 12.5% aqueous sulphuric acid (pH-value of the emulsion 6.8). The water is then distilled off in vacuo at from 70° to 90° C. following the addition of filtration aids (cellulose powder and synthetic magnesium silicate) and an antioxidant (2,6-di-tert.-butyl-p-cresol). The salts are precipitated and the filtration aids are filtered off at a water content of 0.9%. In order to remove the water completely, the filtrate is then distilled in vacuo at from 100° to 105° C.

The pale yellow viscous product obtained has the following physical data:
Hydroxyl number (mg KOH/g), 381
pH-value, 7.9
Water content (%), 0.05
Viscosity $\eta$ 25° C. (mPas), 4540.
(Note: The hydroxyl numbers quoted in the Examples were determined in the conventional way by acylating the polyether using excess phthalic acid anhydride and pyrridine).

To determine the pH-values, a mixture of methanol and water in a ratio, by volume, of 9:1 was used as solvent, 10 ml of the polyether and 100 ml of the solvent being used for pH-measurement. A single-bar glass electrode was used for measuring the pH.)

The polyether polyol obtained in this way is processed into a rigid polyurethane foam in the same way as described in Comparison Example 1, except that the 75 parts of the commercial-grade polyether polyol used in that Example (OH-number 380, viscosity at 25° C.: 12,000 mPas) are replaced by the polyether produced in accordance with Example 1. A rigid closed-cell yellow polyurethane foam is obtained. It has a density of 28.8 kg/m³ and does not show any dimensional changes even after storage for 3 months at −30° C.

The relatively low viscosity of the polyether provide for improved fluidity of the reaction mixture in relation to the standard commercial formulation of Comparison Example 1.

EXAMPLE 2

Following the general procedure described in Example 1, a mixture of polyhydric alcohols having the following composition is produced by the condensation of formaldehyde hydrate with itself to a residual formaldehyde content of 2.5%, followed by hydrogenation of the condensation products:
dihydric alcohols: 1.8%, by weight
trihydric alcohols: 10.3%, by weight
tetrahydric alcohols: 17.5%, by weight
pentahydric alcohols: 39.5%, by weight
hexahydric alcohols: 26.3%, by weight
higher hydric alcohols: 4.4%, by weight.

This corresponds to an average hydroxyl functionality of 4.63. 2657 g of the polyol mixture are initially introduced at room temperature. The air present in the reaction vessel is removed by evacuating the reaction vessel and refilling it twice with nitrogen. After heating to 80° C., 80 g of 50% aqueous potassium hydroxide are added. The readily stirrable mixture is heated to 100° C., followed by the gradual addition (500 g/hour) of 5343 g of propylene oxide under a pressure of from 0.4 to 0.6 bar and at a temperature of from 100° to 105° C. The further reaction and working-up of the reaction mixture are carried out in the same way as described in Example 1.

A pale yellow polyether having the following physical properties is obtained:
Hydroxyl number (mg KOH/g), 556
pH-value, 7.9
Water content (%), 0.05
Viscosity $\eta$ 25° C. (mPas), 29,400.

A polyol formulation is produced from 50 parts of the polyether polyol obtained in this way, 45 parts of a standard commercial-grade polyether based on sucrose/propylene glycol having an OH-number of 540 and an average OH-functionality of 3 and 5 parts of an ethylamine-started basic polyether having an OH-number of 490, 2.1 parts of water, 1.5 parts of a standard commercial-grade foam stabilizer based on a siloxane/oxyalkylene copolymer and 2.1 parts of dimethyl cyclohexylamine. 89 Parts of this polyol formulation are thoroughly mixed, using a high speed stirrer, with 38 parts of dichlorodifluoromethane and 138 parts of a commercial-grade diphenyl methane diisocyanate having an isocyanate content of 31%.

A rigid closed-cell yellow polyurethane foam having a density of 21 kg/m³ is obtained. This foam does not show any dimensional changes, even after storage for 3 months at −30° C.

EXAMPLE 3

Following the procedure of Example 1, a mixture of polyhydric alcohols is produced by the condensation of formaldehyde hydrate to a residual formaldehyde content of 2.0%, followed by hydrogenation of the condensation products, and adjusted to a functionality of 2.98 by mixing with ethylene glycol. Thereafter, the mixture has the following composition:
dihydric alcohols: 43.5%, by weight
trihydric alcohols: 5.9%, by weight
tetrahydric alcohols: 10.2%, by weight
pentahydric alcohols: 21.3%, by weight
hexahydric alcohols: 15.0%, by weight
higher hydric alcohols: 3.9%, by weight.

2616 g of this polyol mixture are reacted with 5384 g of propylene oxide in the same way as in Example 2 and the reaction product worked-up in accordance with Example 1. A colorless product having the following physical properties is obtained:
Hydroxyl number (mg KOH/g), 556
pH-value, 7.1
Water content (%), 0.05

Viscosity η 25° C. (mPas), 840.

The polyether obtained in this way is processed into a rigid polyurethane foam in the same way as described in Example 2.

A rigid closed-cell yellow polyurethane foam having a density of 21.0 kg/m³ is obtained. This foam does not show any dimensional changes, even after storage for 3 months at −30° C.

EXAMPLE 4

A polyether is produced in accordance with Example 2 from the following constituents:
2256 g of the mixture of polyhydric alcohols of Example 2 (average functionality 4.63)
80 g of 50% aqueous potassium hydroxide
5744 g of propylene oxide The pale yellow viscous product obtained has the following physical properties:
Hydroxyl number (mg KOH/g), 472
pH-value, 8.1
Water-content (%), 0.06
Viscosity η 25° C. (mPas), 11,100.

A polyol formulation is produced from 60 parts of this polyether, 24 parts of a standard commercial-grade sucrose/propylene glycol polyether having an OH-number of 380 and a functionality of 3.0, 16 parts of a standard commercial-grade sucrose/propylene glycol polyether having an OH-number of 540 and a functionality of 3.0, 2.1 parts of water, 1.5 parts of a standard commercial-grade foam stabilizer based on a siloxane/oxyalkylene copolymer, 3.0 parts of N,N-bis-dimethylaminopropyl formamide and 1.5 parts of dimethyl cyclohexylamine.

93.5 parts of this polyol formulation are reacted as in Example 2 with 37.0 parts of dichlorodifluoromethane and 134.5 parts of a standard commercial-grade diphenyl methane diisocyanate having an isocyanate content of 31%.

A rigid yellow closed-cell polyurethane foam having a unit weight of 21.0 kg/m³ is obtained. This foam does not show any dimensional changes, even after storage for 3 months at −30° C., and has a compressive strength of 0.17 MPa.

By virtue of the relatively low viscosity, the reaction mixture is more fluid than in the case of conventional formulations which promotes higher compressive strength by virtue of a more uniform distribution of gross density (fewer cells oriented in the foaming direction).

EXAMPLE 5

A polyether is produced in accordance with Example 2 from the following components (in the order indicated):
264 g of a mixture of polyhydric alcohols, of which the composition corresponds to that given in Example 3,
400 g of toluene
80 g of 50% aqueous potassium hydroxide
52.8 g of water are azeotropically distilled off
7736 g of propylene oxide.

The colorless product obtained has the following physical properties:
Hydroxyl number (mg KOH/g), 57.0
pH-value, 7.1
Water content (%), 0.02
Viscosity η 25° C. (mPas), 450.

100 parts of the polyether polyol are thoroughly mixed with 4 parts of water, 1.5 parts of a standard commercial-grade foam stabilizer based on a siloxane/oxyalkylene copolymer, 0.25 part of triethylene diamine and 0.4 part of the tin (II) salt of 2-ethyl caproic acid. 51.5 parts of tolylene diisocyanate (80% 2,4- and 20% 2,6-isomer) are stirred into this mixture by means of a high speed stirrer. After a cream time of about 10 seconds, the foaming reaction begins, resulting in the formation of a white, flexible open-pored elastic polyurethane foam having the following physical properties:
Density according to DIN 53420: 24.0 kg/m³
Tensile strength according to DIN 53571: 1.1 kp/cm²
Elongation at break according to DIN 53571: 185%
Compression hardness (40%) according to DIN 53571: 44 p/cm²
Compression set according to DIN 53752: 4.1%.

EXAMPLE 6

This Example relates to a polyether first produced from propylene oxide and, then after a reaction time of 2 hours after the propylene oxide has been added, from ethylene oxide. The general procedure corresponds to Example 2. The following constituents were used in the order indicated:
264 g of a mixture of polyhydric alcohols having an average functionality of 3 (the composition corresponds to that given in Example 3),
400 g of toluene
80 g of 50% aqueous potassium hydroxide
52.6 g of water were azeotropically distilled off
7350 g of propylene oxide
386 g of ethylene oxide.

The product obtained has the following physical data:
Hydroxyl number (mg KOH/g), 56.6
pH-value, 7.3
Water content (%), 0.02
Viscosity η 25° C. (mPas), 520.

100 parts of this polyether polyol are thoroughly mixed with 4.5 parts of water, 0.15 parts of a standard commercial-grade amine catalyst corresponding to the following formula:

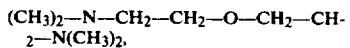

$(CH_3)_2-N-CH_2-CH_2-O-CH_2-CH_2-N(CH_3)_2$.

0.8 part of a standard commercial-grade foam stabilizer (foam stabilizer "BF 2173", a product of the Goldschmidt Company) and 0.1 part of the tin (II) salt of 2-ethyl caproic acid.

51.5 parts of tolylene diisocyanate (80% 2,4-and 20% 2,6-isomer) are stirred into this mixture using a high speed stirrer. The foam which begins to form after a cream time of about 10 seconds is allowed to foam in a mold, giving a white, flexible open-cell elastic polyurethane foam having a density of 31 kg/m³. The foam has a tensile strength according to DIN 53571 of 110 kPa, an elongation at break according to DIN 53571 of 130%, a compression hardness according to DIN 53577 (40%) of 5.2 p/cm² and a compression set according to DIN 53572 (ε 90%) of 7.8%.

A compression test in which a polyurethane foam was produced in the same way, except that the polyether according to the present invention of this Example was replaced by the same quantity of a standard commercial-grade glycerol-started polyethylene glycol/polypropylene glycol polyether, produced the following physical properties:
Unit weight (DIN 53 420): 29 kg/m³
Tensile strength (DIN 53 571): 70 KPa Elongation at break (DIN 53571): 115%
Compression hardness (DIN 53577) (40%): 4.0 KPa
Compression set (DIN 53 572) (ε 90%): 7.7%

The foam produced using the polyether polyol according to the present invention shows increased tensile strength, elongation at break and compression hardness compared to a standard commercial-grade polyether polyol and substantially the same compression set.

EXAMPLE 7

This Example describes the production of a highly functional long-chain polyether which is eminently suitable for the production of flexible elastic polyurethane foams. Production was carried out in the same way as in Example 6 using the following ingredients (in the order indicated): 126 g of a mixture of polyhydric alcohols which was produced in accordance with Example 1 by the condensation of formaldehyde hydrate up to a residual formaldehyde content of 1.5%, has an average OH-functionality of 5.43 and shows the following composition:
dihydric alcohols: 0.3
trihydric alcohols: 3.5
tetrahydric alcohols: 6.2
pentahydric alcohols: 32.0
hexahydric alcohols: 37.9
heptahydric alcohols: 20.0
400 g of toluene
80 g of 50% aqueous KOH
52.7 g of water were azeotropically distilled off
8590 g of propylene oxide
1284 g of ethylene oxide The colorless product obtained has the following physical data:
Hydroxyl number (mg KOH/g), 29.2
pH-value, 7.1
Water content (%), 0.02
Viscosity η 25° C. (mPas), 1420 and is eminently suitable for the production of white, flexible elastic polyurethane foams having considerably increased compression hardness compared to polyurethane foams produced from polyether polyols based on glycerol or trimethylol propane.

What is claimed is:

1. A process for the production of polyether polyols having an average molecular weight of from 200 to 10,000 and an average hydroxyl functionality of from 2.0 to 7.0, comprising reacting one or more alkylene oxides, optionally successively, with a mixture of polyhydric alcohols which mixture has been produced by reduction of the condensation products obtained from the condensation of formaldehyde hydrate.

2. The process of claim 1, wherein the mixture of polyhydric alcohols is characterized by the following molar ratios:

trihydric alcohols:tetrahydric alcohols = from 0.5:1 to 2.0:1 tetrahydric alcohols:pentahydric alcohols = from 0.2:1 to 2.0:1 pentahydric alcohols:hexahydric alcohols = from 0.5:1 to 5.0:1.

3. The process of claim 1, wherein propylene oxide, ethylene oxide or a mixture of propylene oxide and ethylene oxide is used as the alkylene oxide.

4. The process of claim 1, wherein the mixture of polyhydric alcohols used is a mixture of polyhydric alcohols which has been produced by a process which comprises reacting at from 70° to 110° C., aqueous formalin solutions and/or paraformaldehyde dispersions containing from 20 to 65%, by weight, of formaldehyde in the presence of:

(I) soluble or insoluble lead (II) salts or divalent lead bound to a high molecular weight support, and (II) a co-catalyst comprising a mixture of hydroxyaldehyde and hydroxyketones obtainable by the condensation of formaldehyde and which contains at least 75%, by weight, of $C_3$–$C_6$ compounds and is characterized by the following molar ratios:

$C_3$-compound:$C_4$-compounds = from 0.5:1 to 2.0:1

$C_4$-compounds:$C_5$-compounds = from 0.2:1 to 2.0:1

$C_5$-compounds:$C_6$-compounds = from 0.5:1 to 5.0:1 and the pH-value of the reaction solution being adjusted to from 6.0 to 8.0 by the controlled addition of an inorganic or organic base up to a conversion of from 10 to 60% and subsequently continuing the reaction at a pH value of from 4.0 to 6.0, the condensation of the formaldehyde hydrate being interrupted at a residual formaldehyde content of from 0 to 10%, by weight, of formaldehyde by cooling and/or deactivating the lead-containing catalyst with acids, the catalyst being subsequently removed in known manner and the aldehyde and keto groups present in the reaction product being reduced to hydroxyl groups.

5. The process of claim 1, wherein the mixture of polyhydric alcohols used is a mixture of polyhydric alcohols which has been produced by a process which comprises reacting at from 70° to 110° C., aqueous formalin solutions and/or paraformaldehyde dispersions containing from 20 to 65%, by weight, of formaldehye in the presence of:

(I) a soluble or insoluble compound of a metal of the 2nd–4th main or the 1st–8th sub-group of the Periodic System of Elements, optionally bound to a high molecular weight carrier, and (II) a co-catalyst prepared by partial oxidation of a divalent or higher valent alcohol containing at least 2 adjacent hydroxyl groups and having a molecular weight of between 62 and 242 or of a mixture of such alcohols, the pH of the reaction solution being maintained at between 6.0 and 9.0 by controlled addition of an inorganic and/or organic base up to a conversion rate of from 5–40% and thereafter at between 4.5 and 8.0 until termination of the condensation reaction and then stopping the reaction by inactivation of the catalyst in known manner when the residual formaldehyde content is 0–10% by weight; removing catalyst; and reducing the aldehyde and keto groups present in the reaction product to hydroxyl groups.

6. The process of claim 1, wherein the mixture of polyhydric alcohols used is a mixture of polyhydric alcohols which has been produced by a process which comprises reacting at from 70° to 110° C., aqueous formalin solutions and/or paraformaldehyde dispersions containing from 20 to 65%, by weight, of formaldehyde in the presence of:

(I) a soluble or insoluble compound of a metal of the first to eighth sub-group or second to fourth main group of the Periodic System of Elements, optionally bound to a high molecular weight carrier, and (II) more than 10% by weight, based on formaldehyde, of one or more dihydric or higher hydric low molecular weight alcohols and/or higher molecular weight polyhydroxyl compounds, the pH of the reaction solution being maintained between 5.5 and 9.0 by controlled addition of one or more inorganic and/or organic bases up to a conversion rate of 5–40% by weight and being thereafter adjusted to 4.0–8.5 until the termination of the condensation reaction:

then stopping the reaction in known manner by inactivation of the catalyst when the residual formaldehyde content is from 0–10% by weight;

removing the catalyst and reducing the aldehyde and keto groups present in the reaction product to hydroxyl groups.

7. The process of claim 1, wherein the mixture of polyhydric alcohols used is a mixture of polyhydric alcohols which has been produced by a process which comprises introducing synthesis gases containing formaldehyde continuously or discontinuously at temperatures of between 10° and 150° C. into an absorption liquid comprising
  (a) 5 to 99% by weight of water,
  (b) 0.1 to 90% by weight of compounds capable of enediol formation as cocatalysts,
  (c) 0 to 20% by weight of soluble or insoluble metal compounds as catalysts optionally bound to high molecular weight carriers, and
  (d) 0 to 60% by weight of one or more monohydric or higher hydric low molecular weight alcohols and/or higher molecular weight polyhydroxyl compounds and having a pH of 3 to 10, and the formaldehyde being condensed at the same time or, if the absorption solution contains no catalyst, the formaldehyde being condensed subsequently by the addition of catalyst, stopping the condensation of formaldehyde with itself by cooling and/or by inactivation of the catalyst with acids in known manner when the reaction mixture has a residual formaldehyde content of from 0 to 10% by weight; removing the catalyst in known manner; and reducing the aldehyde and keto groups present in the reaction product to hydroxyl groups.

8. A process for the production of optionally cellular polyurethane plastics comprising reacting:
  (a) polyisocyanates; with
  (b) relatively high molecular weight compounds containing isocyanate-reactive hydrogen atoms; and, optionally,
  (c) chain-extenders; optionally in the presence of
  (d) blowing agents, catalysts and other known additives;

wherein polyether polyols produced in accordance with claim 1 are used, optionally in part, as component (b).

9. The process of claim 1 wherein said mixture of polyhydric alcohols is mixed with dihydric and/or trihydric alcohols and/or monoamines or polyamines prior to alkoxylation.

10. The process of claim 9, wherein ethylene glycol, diethylene glycol or 1,3-propylene glycol is used as the additional dihydric alcohol.

* * * * *